United States Patent [19]

Linquist et al.

[11] Patent Number: 5,423,056
[45] Date of Patent: Jun. 6, 1995

[54] ADAPTIVE CELLULAR PAGING SYSTEM

[75] Inventors: Roger D. Linquist; Malcolm M. Lorang, both of Dallas, Tex.

[73] Assignee: Pagemart, Inc., Dallas, Tex.

[21] Appl. No.: 236,247

[22] Filed: May 2, 1994

Related U.S. Application Data

[63] Continuation of Ser. No. 661,078, Feb. 26, 1991, abandoned.

[51] Int. Cl.$^6$ .............................................. H04B 7/26
[52] U.S. Cl. ............................... 455/33.1; 455/12.1; 455/51.1; 455/56.1
[58] Field of Search .................... 455/12.1, 13.2, 33.1, 455/33.2, 33.4, 51.1, 51.2, 38.1, 56.1, 57.1, 54.1, 54.2; 340/825.44, 311.1; 379/57, 59

[56] References Cited

U.S. PATENT DOCUMENTS

| | | | |
|---|---|---|---|
| H610 | 3/1989 | Focarile et al. | 379/60 |
| 4,398,192 | 8/1983 | Moore et al. | 340/825.44 |
| 4,670,905 | 6/1987 | Sandvos et al. | 455/33.4 |
| 4,747,120 | 5/1988 | Foley | 379/58 |
| 4,747,122 | 5/1988 | Bhagat et al. | 379/60 |
| 4,829,554 | 5/1989 | Barnes et al. | 379/58 |
| 4,918,437 | 4/1990 | Jasinski et al. | 340/825.44 |
| 4,943,803 | 7/1990 | Vrijakorte | 340/825.49 |
| 4,956,875 | 9/1990 | Bernard et al. | 455/13.1 |
| 4,969,966 | 11/1990 | Jasinski et al. | 340/825.44 |
| 5,077,830 | 12/1991 | Mallia | 455/38.1 |
| 5,122,795 | 6/1992 | Cubley et al. | 455/32.1 |

OTHER PUBLICATIONS

Steven Ritter and J. McCoy, "Automatic Vehicle Location—An Overview", *IEEE Trans. on Veh. Tec.*, vol. VT–26, No. 1, Feb. 1977, pp. 7–9.

M. Kihara, "Performance Aspects of Reference Clock Distribution for Evolving Digital Networks", *IEEE Communications Magazine*, Apr. 1989.

"Unwanted Calls? Turn on Pager Phone", *USA Today*, Dec. 28, 1990, p. 8B.

Gardner, W. A. and Chen C. K., "Interference-Tolerant Time-Difference-Arrival Estiamteion fofr Modulated Signals", *IEEE Trans. on Acous., Speech and Sig. Proc.*, vol. 36, No. 9, Sep. 1988, pp. 1385–1395.

D. C. Cox, "Universal Digital Portable Radio Communications," *Proc. of the IEEE*, vol. 75, No. 4, Apr. 1987, pp. 436–477.

*Telocator Bulletin, News and Analysis for the Mobile Telecommunications Industry*, vol. 91, No. 3, Jun. 25, 1991.

M. Kihira, "Performance Aspects of Reference Clock Distribution for Revolving Digital Networks", *IEEE Comm. Magazine*, Apr. 1989, pp. 24–34.

*Primary Examiner*—Curtis Kuntz
*Assistant Examiner*—Chi H. Pham
*Attorney, Agent, or Firm*—Gregory M. Howison

[57] ABSTRACT

An adaptive paging system includes a paging terminal that is operable to receive paging signals and transmit them up to a satellite (28) and down through a downlink (312) to stick locations (314), (316), (318), (320) and (322). Each of the sticks (314)–(322) is associated with a given locale (324), (326), (328), (330) and (332). The sticks are operable in a simulcast mode and also in a cellular mode. In the cellular mode, each of the sticks (314)–(322) is operable to receive a separate message that is distinct from the other cells. Pagers (36), having a known location at any of the locales (324)–(332) can then be selectively addressed and data transferred thereto. To prevent interference between adjacent RF locales, adjacent cells are not turned on during transmission to select cells in the cellular mode. These can be turned on at a different time. Orthogonal coding can be utilized such that adjacent cells can be turned on, thus increasing throughput.

13 Claims, 9 Drawing Sheets

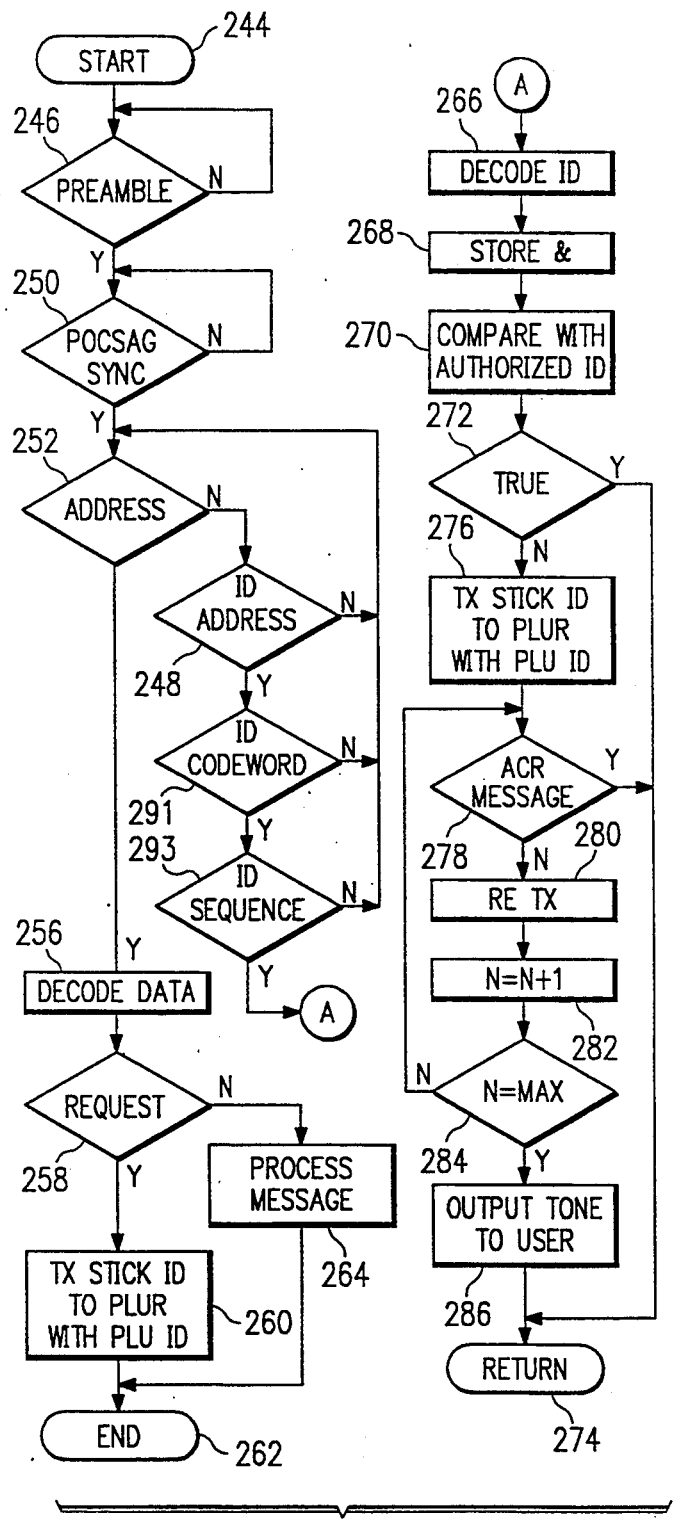
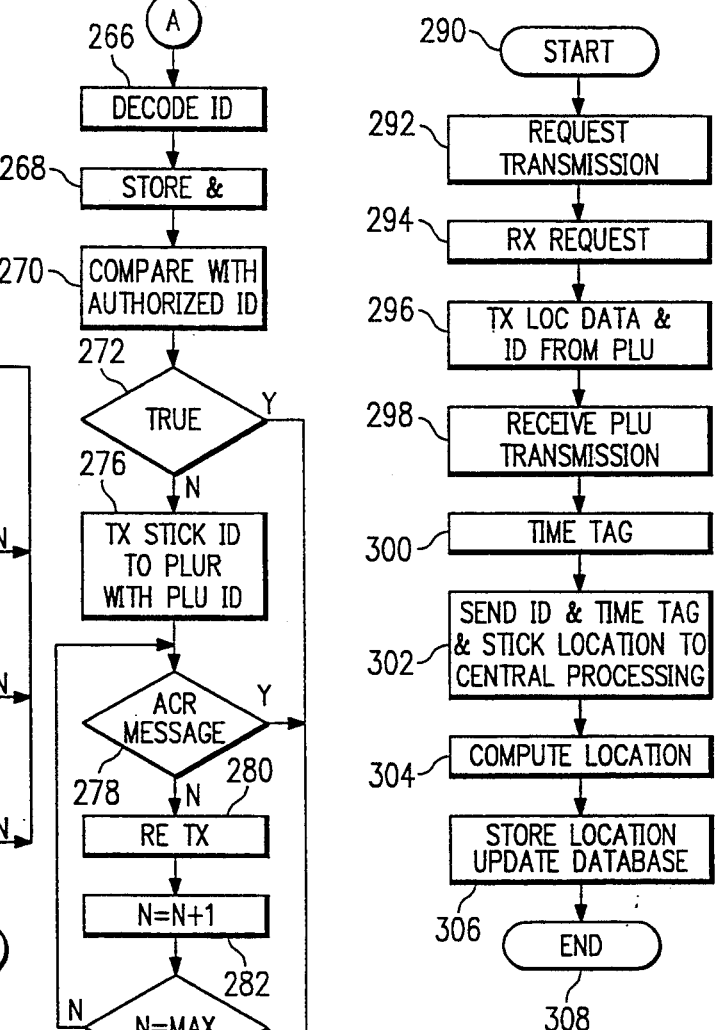
FIG. 9
PLU FLOW CHART
FIG. 10
TIME OF ARRIVAL

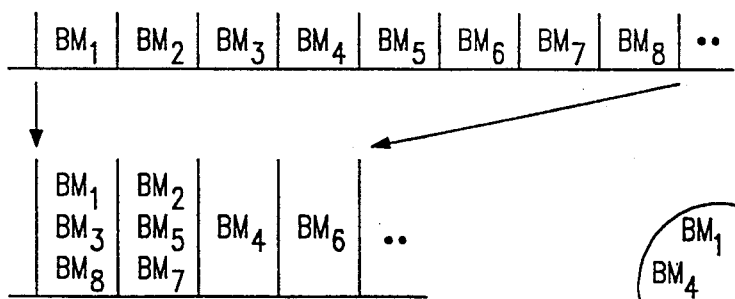
FIG. 14b
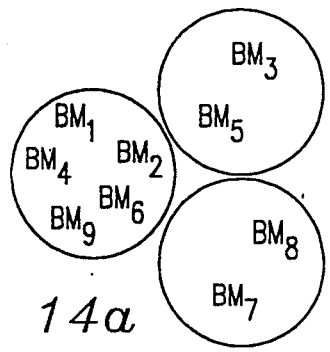
FIG. 14a
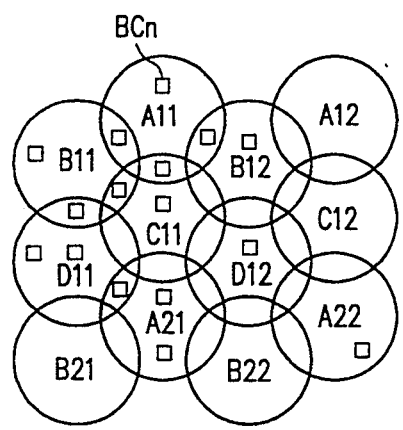
FIG. 15
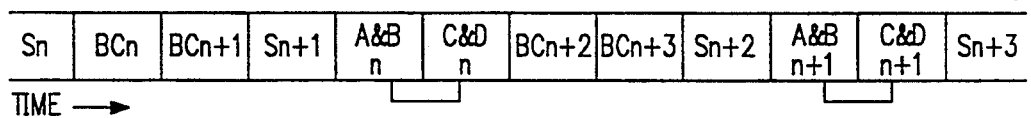
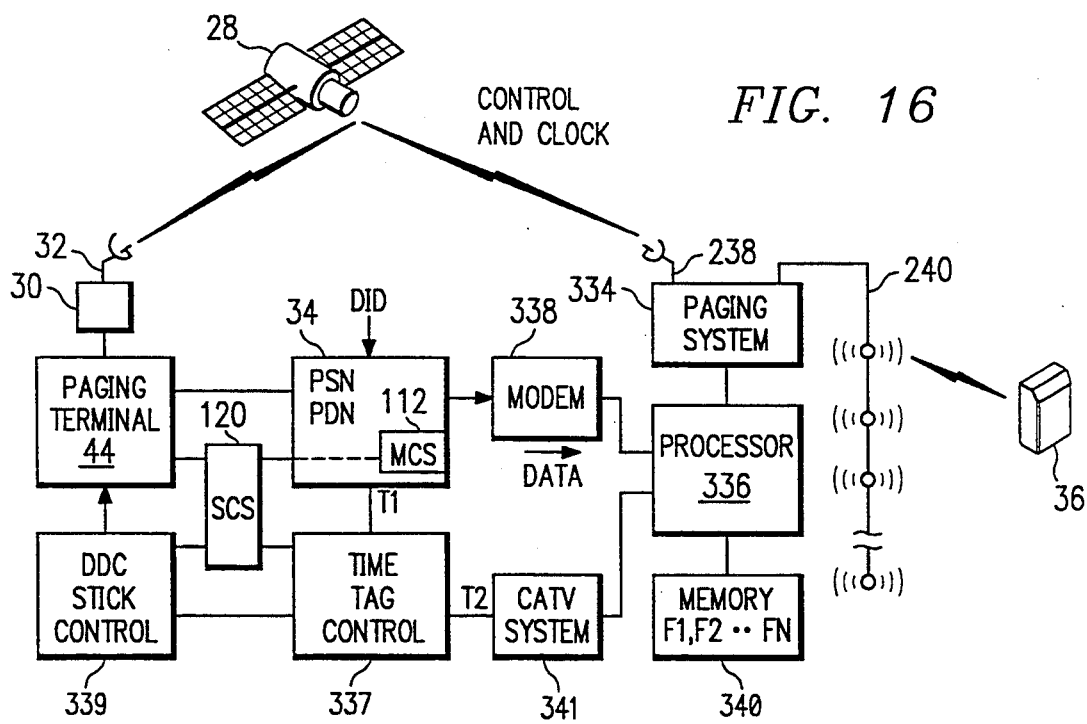
FIG. 16

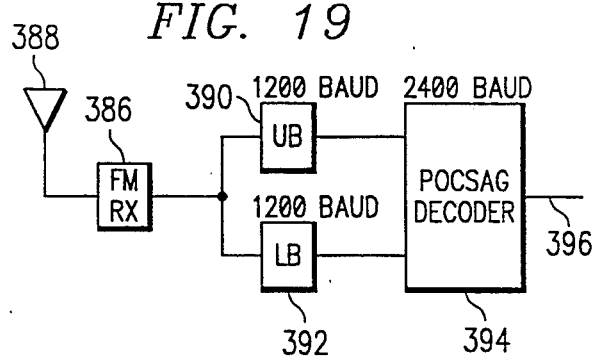
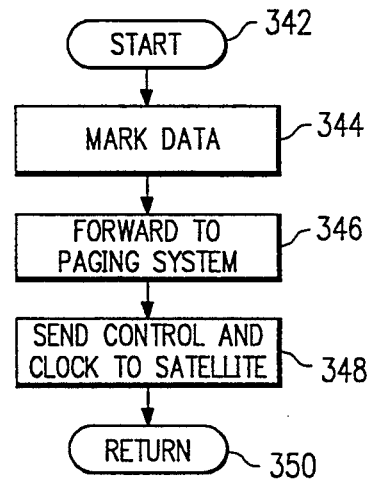
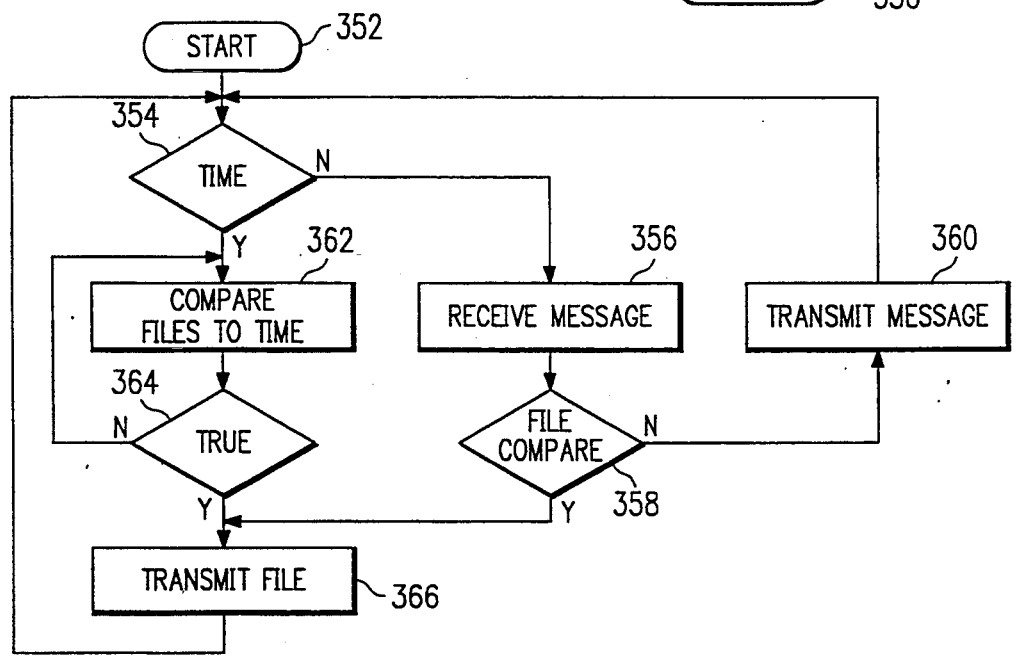
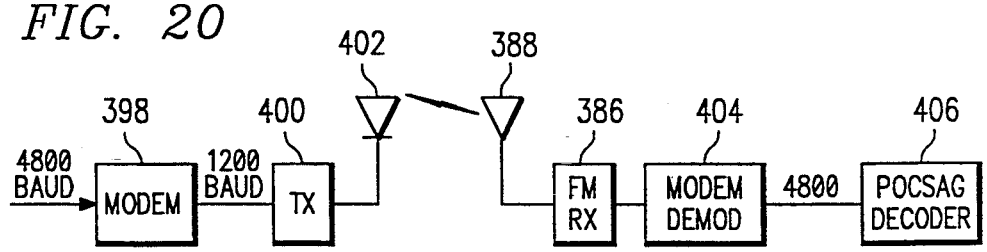

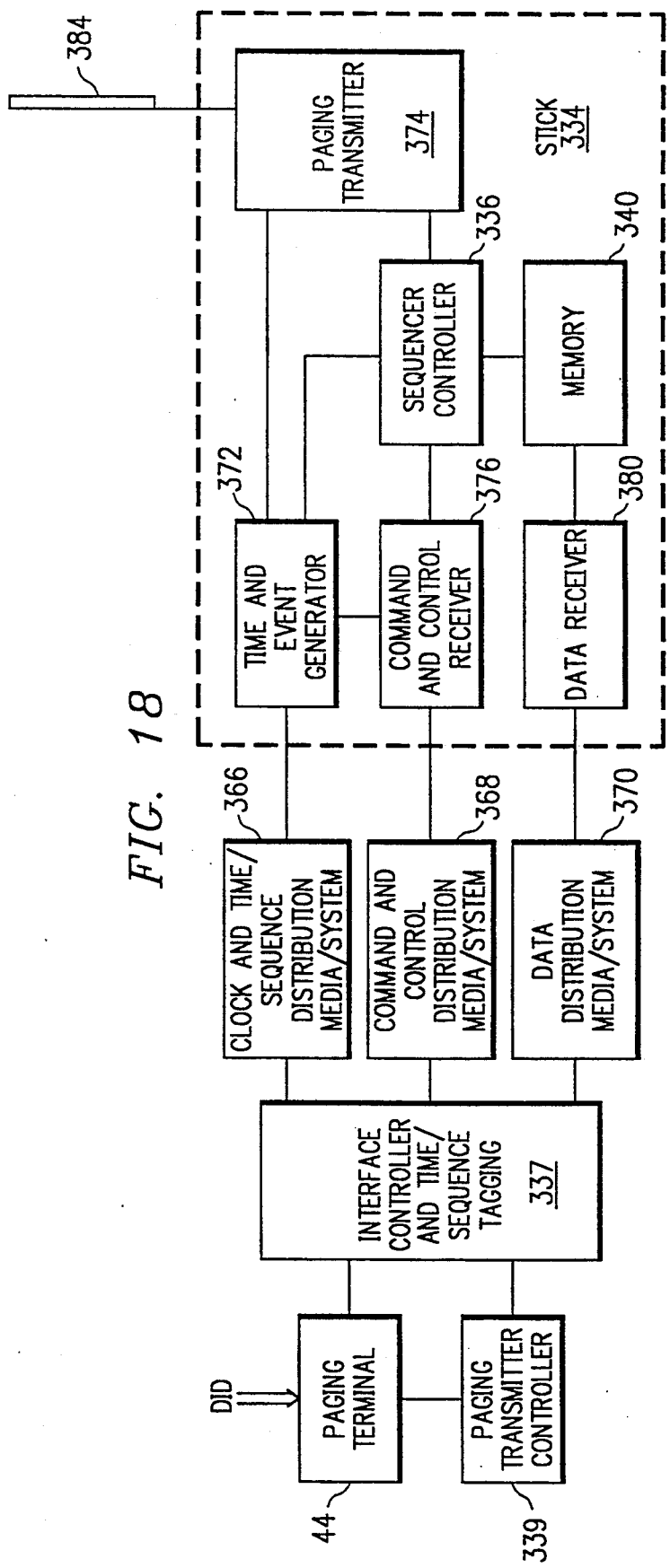

ADAPTIVE CELLULAR PAGING SYSTEM

This application is a Continuation, of application Ser. No. 07/661,078, filed Feb. 26, 1991, now abandoned.

TECHNICAL FIELD OF THE INVENTION

The present invention pertains in general to a system for determining the receiving location of a paging receiver and delivering data thereto and, more particularly, to a location detection system that operates in conjunction with an already existent paging system to determine location and adaptively divide the system into cells for delivery of messages to select cells.

CROSS-REFERENCE TO RELATED APPLICATION

This application is co-pending with U.S. patent application Ser. No. 08/088,400, entitled, "Personal Location Pager System", filed concurrently herewith.

BACKGROUND OF THE INVENTION

Tracking the location of an individual or an object that can move in unknown directions has been a concern for a number of years. This has particularly been so for designers of urban communications systems. There are a large number of applications which require knowledge of the location of the object or person, such as fleet management, felons subjected to "house arrest", tracking of patients in health care units, the location of stolen or lost vehicles, the general location of any individual, etc. These systems have employed a variety of techniques including radio location, dead-reckoning and proximity systems.

In one type of system termed "Automatic Vehicle Location" (AVL), various systems are employed to determine the location of a vehicle for the purpose of monitoring the location of a fleet or to find a lost or stolen vehicle. The systems have utilized a number of methods, one of which is the radio location method. In the radio location method, a number of towers are disposed at predetermined locations around a city to allow communication with vehicles in their vicinity. The location method typically utilizes triangulation which requires a comparison of a received signal from the vehicle with respect to a time base to determine the time of arrival of the signal at the receiving antennas. Typically, these antennas have very high powered transmitters that are operable to turn on the transmitter in the vehicle from a remote location by transmitting a request for ID to the vehicle and that vehicle, having the corresponding ID, then transmitting back an answer. It is the receipt of this answer that allows the triangulation method to be facilitated. However, this type of system suffers from a number of disadvantages. First, only very few vehicles can be located in this manner and it is desired to determine the movements of large fleets of vehicles with this method. Second, they require a dedicated system, which requires a specific request for an ID and the assumption that the vehicle is within the vicinity of the transmitter. Therefore, any one locale would be limited to the number of transmitters and/or receivers that are disposed at that one locale. AVL Systems are described in Steven Ritter and Jan McCoy, "Automatic Vehicle Location—An Overview", IEEE Transactions on Vehicular Technology, Vol. VT-26, No. 1, February 1977, which is incorporated herein by reference.

In another type of system, conventional location systems such as Loran-C and GPS Systems are utilized which are satellite-based systems. These are very sophisticated systems and have been typically utilized by large fleet management systems. These systems are typically expensive, but provide for fairly accurate location of a vehicle in substantially real time. Of course, these systems require some type of satellite receiver and obtain their accuracy by relying upon the very solid time base that is provided by the satellite.

In another type of system, a person's location is determined by their proximity to a receiver, or their lack of proximity thereto. In health care units, transmitters are attached to an individual and when the individual leaves a pre-defined zone, a receiver fails to pick up the transmitted signal and sounds an alarm. This type of system is also utilized with house arrest programs for convicted felons that are not considered to be dangerous and are allowed to exist outside penal institutions. Other systems require the felons to check in at random times and to interface a coded bracelet with the receiver on the telephone to confirm that they are, in fact, the individual that has answered the phone. These sometimes can be combined with video systems.

Once the location of an individual or an object is determined, this information is then useful in controlling a paging system for selective delivery of messages. In some paging systems, the location of a paging receiver in a paging system is defined in a database for one of a plurality of hubs. In this manner, throughput can be increased by transmitting different messages simultaneously to two different hubs and two different defined sets of users. Of course, this assumes that a paging receiver resides in the hub having the ID of the pager in its database. However, one problem in the past has been the mobility of the paging receivers which allows an individual to travel between various hubs. The only way to update the database at present is for the user to call in to a central station and have the paging terminal database updated with the new location. This, of course, needs to be done on a central level.

SUMMARY OF THE INVENTION

The present invention disclosed and claimed herein comprises an adaptive paging system for delivering messages to a paging receiver. The system includes first and second paging system for receiving messages, each of the first and second paging systems having a paging transmitter for transmitting the received messages over an RF link to ones of the paging receiver that are within a predetermined locale about the paging transmitter. A location system is provided for determining the presence of a paging receiver within either of the first and second paging systems predetermined locales. A transmission device is also provided that generates and transmits the paging messages that are designated for predetermined ones of the paging receivers. A transmission link is provided for connecting the transmission device to the first and second paging systems. Routing control circuitry controls the transmission device to transmit the messages only to the one of the first and second paging systems at which the location system has determined the destination paging receivers to be located at.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates a block diagram of the boosting receiver;

FIG. 9 illustrates a flowchart for the operation of the PLU;

FIG. 10 illustrates a flowchart for calculating the time-difference-of-arrival (TDA);

FIGS. 14a and 14b illustrate the arrangement of batch messages for transmission to cellular sites;

FIG. 15 illustrates a diagrammatic view of the cellular sites and further including localized building sites;

FIG. 16 illustrates a block diagram for an alternate embodiment illustrating transmission of data over a phone line or CATV line;

FIGS. 17a and 17b illustrate flowcharts for the system of FIG. 16;

FIG. 18 illustrates a more detailed block diagram for the system of FIG. 16;

FIG. 19 illustrates a block diagram of the receiver in the PLU for receiving upper and lower sideband signals, to allow orthogonal coding; and FIG. 20, illustrates a block diagram of an alternate embodiment for increasing the throughput of the system utilizing precoding.

DETAILED DESCRIPTION OF THE INVENTION

Figure 1:
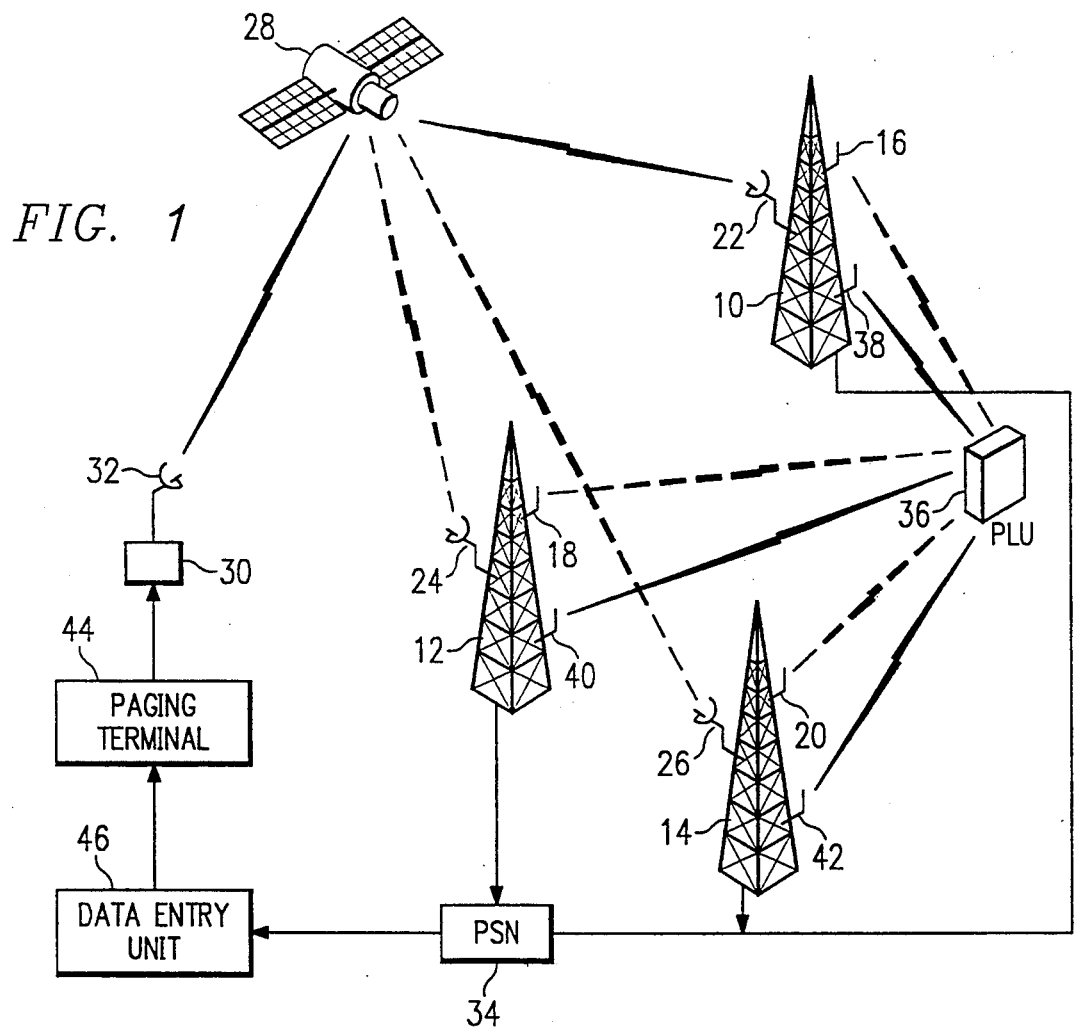
FIG. 1 illustrates a perspective view of the paging system of the present invention.

Referring now to FIG. 1, there is illustrated a perspective view of the system of the paging system of the present invention. Three antenna towers 10, 12 and 14 are illustrated, which are referred to as "sticks". The sticks 10–14 represent only three of a plurality of sticks that are utilized in a paging system. Essentially, each stick 10–14 has a predetermined coverage area which is provided from paging transmitter antennas 16, 18 and 20, respectively. Each of the antennas operates to provide a relatively even coverage in all directions from the antennas 16–20 with respect to signal strength. The patterns are designed such that they overlap. The general operation of the paging portion of the present invention is described in U.S. patent application Ser. No. 612,064, filed Nov. 13, 1990, and entitled, "Satellite Control Link", which is incorporated herein by reference.

Each of the sticks 10–14 has associated therewith a satellite receiver 22, 24 and 26, respectively. Each of the satellite receivers 22–26 is designed to receive paging information from a geosynchronous satellite 28 in a simulcast mode. Paging information is transferred to a satellite 28 from an uplink 30 and associated satellite transmitting antenna 32. Therefore, paging information can be queued up at the paging terminal 44 and then transmitted by the uplink 30 from the antenna 32 to the satellite 28 for re-transmission to all the antennas 22–26 on sticks 10–14, respectively, in a simulcast manner. In this manner, the transmission arrives at each of the sticks 10–14 and their associated satellite receivers 22–26, at substantially the same time. Further, as will be described hereinbelow, the base station equipment associated with each of the sticks 10–14 has a clock that is synchronized with the clock of a public switched network (PSN) 34, and which transmitted signal to the satellite 28 is also synchronized. Therefore, in addition to the time of arrival of the signal at the satellite receivers 22–26 being the same, the data clocks are also synchronized and use for clock recovery synchronization at the base station. This negates the need for a highly stable local oscillator at each base station.

A personal location unit (PLU) 36 is provided that is attached to either an individual or an object which can move relative to the fixed location of the sticks 10–14. The PLU 36 is essentially a modified pager that is of conventional construction. The PLU 36 is operable to receive a paging message in a conventional manner from the paging transmitter antennas 16–20, provided that it is within transmission range and the signal is above the noise level of the PLU 36. In a conventional manner, the PLU 36 will receive paging messages from the one of the paging transmitter antennas 16–20 that has the highest signal level, i.e., it locks onto the strongest signal. In this manner, there will be no contention for the reception of this information.

A modification feature of the PLU 36 relative to a conventional pager is that the PLU 36 has stored internal thereto sufficient memory to store the ID or call sign of the one of the paging transmitters associated with paging transmitter antennas 16–20 that it receives information from. FCC regulations require that this call sign be transmitted on a periodic basis, typically every fifteen or thirty minutes, or once per transmission transaction. The PLU 36 is sequenced on and looks for sync and paging messages or station ID transmitted thereto. If the sync word and paging message is the assigned vector stating that the following sequence is the station ID or call sign, the receiver will switch to call sign or station ID detection for the following period. The base station ID transmission is preceded by a POCSAG batch with an idle address plus data that is a unique vector designated to mean that the base station ID's are to follow this POCSAG batch. An alternate to this is the modulo-two add a vector with the sync word to designate the following time slot for station call signs or IDs. Even though a message is not designated for the PLU 36, it does receive the ID of the one of the sticks 10–14 that is closest thereto and which has the strongest signal, as will be described hereinbelow. This ID information is stored, and at a later time, a message can be transmitted to the PLU 36 via the conventional paging network and antennas 16–20 to request location information from the PLU 36. In response to this request, the PLU 36 transmits on another frequency the information to the system, which is received at each of the sticks 10–14 on a receiving antenna 38, 40 and 42, respectively, assuming that the receiving antennas 38–42 are within the transmission range of the PLU 36. For power considerations, it should be understood that the power level on the transmitter portion of the PLU 36 is relatively low.

The information that is transmitted to the antennas 38-42 provides the last received ID or call sign, which was transmitted thereto on the periodic basis from one of the antennas 16-20. The information received by the receiving antennas 38-42 is transmitted to the PSN 34 and then back to a paging terminal 44 through a data entry unit (DEU) 46. This information is utilized to determine the location of the PLU 36, as will be described in more detail hereinbelow.

In the above described operation, two methods are utilized by which to determine the general location of the PLU 36. First, by knowing the general ID of the stick 10-20, a rough idea of the location of the PLU 36 can be determined. For example, in a paging system where specific hubs are defined around the country with each hub defining a different locale, it would be desirable to know which of the hubs the PLU 36 is in. To increase throughput, it is desirable to minimize the number of messages that are sent to any given hub, since it is only necessary to transmit the messages to the hub in which the PLU 36 is located. Present systems provide for this, but these systems must assume which location the PLU 36 is in. Of course, the user of the PLU 36 could phone in a change of location and their ID could be redirected to a different hub. The present invention, however, provides for automatic determination of the location of the PLU 36 for the purposes of transmitting messages thereto. Therefore, by knowing the ID of the sticks that are in the general vicinity of the PLU 36, the hub in which the PLU 36 resides can be determined and messages can be routed to that hub without requiring them to be routed to all of the hubs in the network, which significantly decreases throughput.

Additionally, the system of the present invention also can determine that the PLU 36 is disposed within the transmission range of any one of the sticks 10-14 or the other sticks in the system. Of course, the accuracy of this determination depends upon the time lapse between transmission of the ID from the associated sticks 10-14 and the time of the location determination and the time that a message is transmitted to the PLU 36. Of course, if the PLU 36 is associated with an individual or an object that has not moved in that time, then the integrity of the data is high. However, there is no knowledge as to the mobility of the PLU 36 and, therefore, as this time lapse increases, the integrity of the location data decreases. Therefore, to increase the integrity of the data, the sticks 10-14 are controlled to transmit their ID followed by a request for location for a given PLU 36. This method of locating provides a rough approximation of which best radio link location the PLU 36 is in. Of course, by knowing only the location of the PLU 36 relative to the one of the sticks 10-14 having the highest signal received by the PLU 36, the system is provided with the location of the PLU 36 within the radius of the transmitted energy from only one of the sticks 10-14. Since the radius can be upward of five miles, this is a relatively inexact location method, and is primarily used to determine which of the hubs or stick the PLU 36 has best RF link communication in.

A second method to further define the location of the PLU 36 is that utilizing a triangulation method. This is basically a radio location method. The PLU 36 is operable to receive a request for transmission and transmit this request to the receiving antennas 38-42 at each of the sticks 10-14 and any other sticks that are operable to receive the transmission. Upon receipt of the transmitted data which includes the ID of the PLU 36, the data is time-marked. This time-marked data is then transmitted to the PSN 34 for transmission back to the paging terminal 44 and there processed in accordance with various "time of arrival" algorithms. In this manner, a relatively precise measurement of location can be made, knowing the location of the sticks that receive the data. The general systems for determining a various Time-Difference-of-Arrival estimation is described in W. A. Gardner and C. K. Chen, "Interference-Tolerant Time-Difference-Of-Arrival Estimation for Modulated Signals", IEEE Transactions on Acoustics, Speech and Signal Processing, Vol. 36, No. 9, Sep. 1988, which is incorporated herein by reference.

Figure 2:
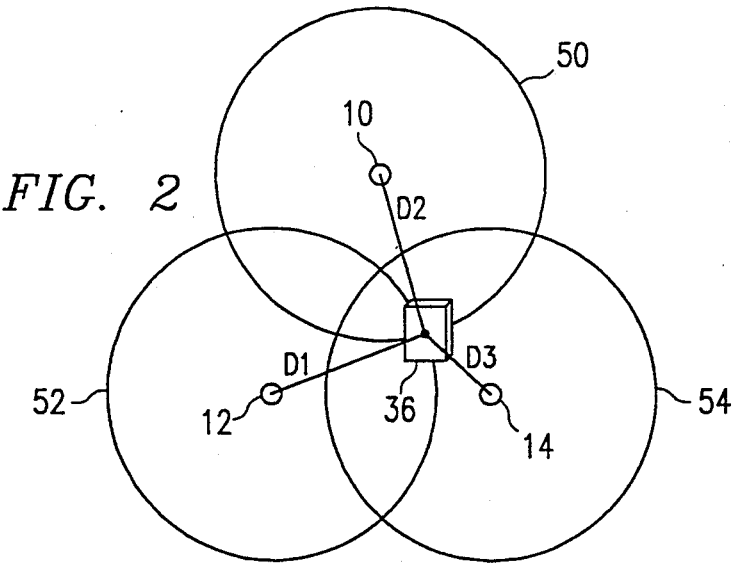
FIG. 2 illustrates a diagrammatic view of the triangulation method for detecting location.

The basic Time-Difference-of-Arrival system (TDA) operates as illustrated in FIG. 2. Each of the sticks 10-14 have associated therewith a transmission pattern, 50, 52 and 54. The request signal is picked up by the PLU 36 as a result of it being in at least one of the transmission patterns 50-54. Of course, the signal having the highest amplitude will be captured by the PLU 36 and only the message received from that associated stick 10-14 will be processed and the message decoded therefrom. Thereafter, the internal transmitter in the PLU 36 will transmit the unique ID of the PLU 36 and the prestored call sign ID of the last received call sign ID back to the sticks 10-14. The call sign ID may be combinations of the FCC required station ID, the unique identifier and a unique vector during idle address and/or data. Of course, depending upon the power level and the transmission characteristics of the surrounding environment, other sticks in the proximity may also receive the signal. The receiving antennas associated with the sticks 10-14 are then operable to receive the transmitted message from the PLU 36 and time-stamp it. The clocks at each of the sticks 10-14 are synchronized to provide a very stable time base and therefore reduce error when the TDA algorithm estimation is made. The data is then transmitted from the sticks 10-14 back to a central processing center through the PSN 34. Since the message requesting data transmission from the PLU 36 was transmitted in a particular time slot, the central system at the paging terminal 44 can determine when the data for that particular PLU 36 has been received.

Figure 3:
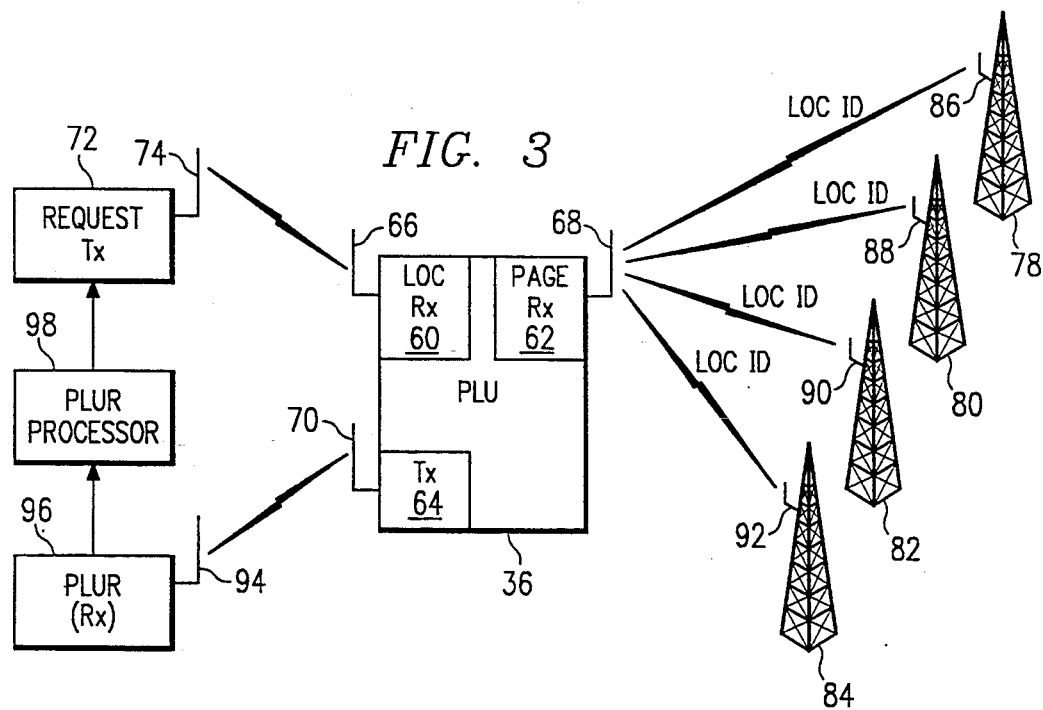
FIG. 3 illustrates a block diagram of the system.

Referring now to FIG. 3, there is illustrated a block diagram of the location portion of the present invention. The PLU 36 has associated therewith a location receiver 60, paging receiver 62 and a transmitter 64. The PLU 36 is illustrated as having a separate antenna 66 associated with a location receiver 60, an antenna 68 associated with a paging receiver 62 and an antenna 70 associated with the transmitter 64. In actuality, the antennas 66-70 are a single antenna, as will be described hereinbelow. However, for illustrative purposes, they are depicted as separate antennas.

A request transmitter 72 is provided at a remotely disposed location from the PLU 36 for transmitting a request from a transmitting antenna 74 to the antenna 66 associated with the location receiver 60. This request is interpreted by the PLU 36 as requesting transmission of ID information and location information. As described above, the location information is in the form of the location ID of the strongest one of the sticks, which ID was previously received and stored. In addition, the PLU 36 has a paging receiver 62 that is operable to receive paging messages from one of a plurality of sticks 78, 80, 82 or 84, which transmit the paging information therefrom on antennas 86, 88, 90 and 92, respectively.

In the preferred embodiment, the request transmitter 72 is identical to the paging transmitter in the sticks 78–84, such that the antenna 74 is common with antennas 86–92. Additionally, the request is essentially a message that is transmitted in the conventional paging system, which message has data associated therewith that is interpreted by the PLU 36 as a request for an ID. Once a request has been received, the transmitter 64 of the PLU 36 transmits stored the location ID out to a receiving antenna 94 on a PLU receiver (PLUR) 96 in association with the unique ID of the PLU 36. PLUR 96 is connected to a PLU processor 98, which also controls the request transmitter 72. The PLU processor 98 is operable to receive the information from the PLU 36 and process this information. As described above, this information can merely be the stored location ID of the stick having the strongest signal received by the PLU 36 during transmission of location ID from the sticks 78–84. Alternately, the PLU processor 98 could receive multiple inputs from multiple PLURs 96, which have placed a time stamp on the received message from the transmitter 64. This time stamp is utilized to make a TDA estimation, and, knowing the location of the PLURs from which the information was received, determine with relative accuracy the location of the PLU 36 at the time of transmission therefrom. Of course, this is a function of the time base that exists at each of the PLURs 96 and at the PLU processor 98.

With the location portion of the present invention, it is important to note that the first method of location utilizes the location ID of the one of the sticks 78–84 having the strongest signal at the time of transmission of the location ID. This provides not only the ability to determine the location of a PLU 36 knowing the location of the stick, but it also determines the location of the PLU 36 as a function of its power reception capability. This is important as one aspect of the present invention is directed toward locating the PLU 36 for the purposes of transmitting messages thereto. The actual spatial location of a PLU 36 for this purpose is insignificant. Rather, it is important to know which of the sticks 78–84 has the transmitted signal therefrom received with the highest signal strength by the PLU 36. Although the location of the stick is known, the actual transmission characteristics are not exactly known and, in fact, the spatial location is of no use in determining from which stick 78–84 information should be transmitted to be received at the PLU 36. Since the PLU 36 will capture the strongest signal from only one stick, it is that stick that should have a later message transmitted therefrom in order for the PLU 36 to receive it from only that stick. Conventional paging systems transmit information from all of the antennas 86–92, as they do not know which signal the PLU 36 will receive. This significantly decreases throughput. Rather, if it could be determined clearly that a given PLU 36 is associated with a given stick, then it is only necessary to transmit information from the selected stick during a given time slot to the desired PLU 36. The remaining sticks can transmit different messages to different PLUs. Therefore, it is important to have present in the system database location information for the PLU 36 in the form of which stick in the system will transmit the strongest signal to the PLU 36 for a later paging message, i.e., which one will it "capture". It is not of interest for this application whether the PLU 36 is located to the north or to the south of the stick but, rather, only that the PLU 36 will capture the signal from that stick as the strongest signal.

Since the integrity of the location measurement is a function of time relative to the time at which the location ID was determined, it is necessary to coordinate requests for location information from the transmitter 72 with the actual time at which the location ID was transmitted. The time that the location ID is transmitted is known in a system. Typically, this is transmitted as infrequently as possible, as it will reduce throughput. However, once it is transmitted, transmission requests can then be transmitted immediately thereafter, it being known that a certain time has elapsed before the requested PLUs 36 transmit back a response. For example, if it were desired to determine the location of five paging transmitters (64), the next five messages following the transmission of the location ID would be requests for these five PLUs to transmit back their location information. PLUR processor 98 would therefore expect to receive five sequential messages back from the five PLUs 36 in a predetermined time slot. The time lag would be known, and it would be on the order of a few seconds.

In one application for the present invention, a large number of PLUs 36 can have a location thereof determined for the purpose of increasing throughput for subsequent transmission of data. If, for example, one hundred PLUs 36 were located by the system of the present invention, this could be followed by transmission of messages to all of the sticks in a parallel manner. If it were determined, for example, that all one hundred PLUs 36 were equally divided among four sticks, twenty-five to each, then twenty-five messages could be transmitted to each stick in a sequential and parallel manner to cover all one hundred PLUs 36 such that the throughput is increased by a factor of four for the transmission of those messages.

In another aspect of the present invention, the PLU 36 is operable to compare a received location ID with its stored ID that was previously determined or which is stored in a look-up table that was previously programmed indicating the area in which the paging system expected the PLU 36 to reside. If the received location ID from any one of the sticks in the vicinity of the PLU 36 did not compare with those internally stored, this would indicate that the PLU 36 was outside of its designated location, i.e., the system did not know its location. Under these circumstances, the paging system would not transmit messages designated for that PLU 36 to the sticks in the proximity thereof. Once the PLU 36 recognizes that the ID does not compare with the internally stored IDs, the PLU 36 initiates a transmission of the location ID back to the PLUR receiver 96. This would then be processed by the PLUR processor 98 and forwarded back to a paging terminal such that when message data was encoded, it would be routed to the appropriate hub or stick.

In one application of the above system, a PLU 36 could be associated with a given hub which consisted of two cities. When the individual travels to a different hub, as soon as it came within range of the paging transmitter from one of the sticks in the new hub and at a time that a location ID was transmitted, the PLU 36 would then update the system as to its location. Of course, an acknowledgement would be required in that there may be some contention, as the PLU 36 would transmit its ID with no request. In this mode, it might transmit over another transmit from another PLU 36 in its area. The PLU 36 transmitting its ID information would therefore wait for an acknowledgement message from the system indicating that the location was now in the data base. If the acknowledgement is not received, the PLU 36 retries transmission of the message with the location ID until the system recognizes its location and acknowledges. If the acknowledgement is not received after a predetermined number of tries it sends a message to the use via display or acoustical means.

Figure 4:
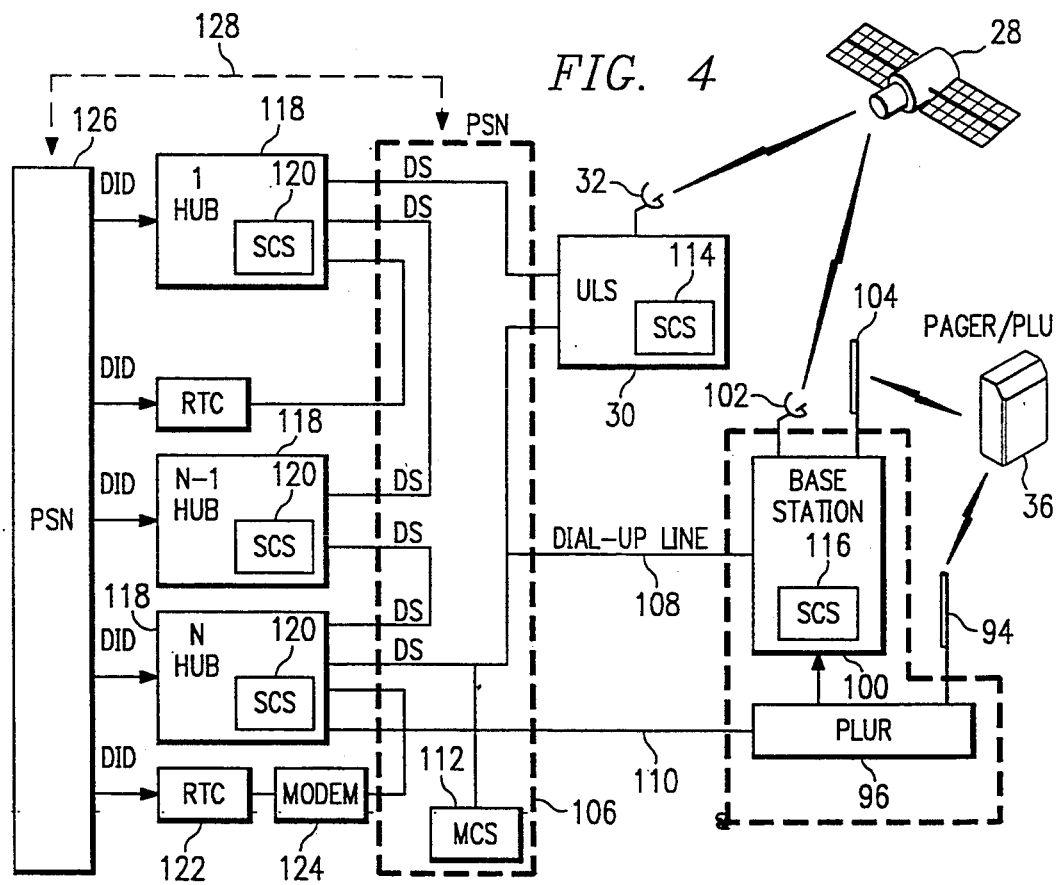
FIG. 4 illustrates a more detailed block diagram of the system illustrating one base station.

Referring now to FIG. 4, there is illustrated a block diagram of a base station at one of the sticks and its associated PLUR 96. Each of the sticks has associated therewith a base station 100 that in general includes a satellite receiver for receiving information on a satellite receiving antenna 102. The base station has associated therewith a paging antenna 104 that is similar to the antennas 86, 88, 90 and 92 on the sticks 78–94. Additionally, the request information is transmitted out through the antenna 104 to the PLU 36.

The base station 100 and the PLUR 96 are both connected to a public data network (PDN) 106 through phone lines 110 which allow for transmission of digital data through the data network 106. Data network 106 includes a master clock signal (MCS) 112, which is normally generated by the telephone company, and maintained at a very accurate phase and frequency with minimal drift. This clock is utilized by the uplink 30 through a slave clock system (SCS) 114 and the base station 100 also locks up to this clock through an SCS 116. The Slave Clock (SCS) 116 may be linked to the MCS via a 56k-bit line or through the data clock from the satellite receiver. The PLUR 96 is also locked with the SCS 116 to the MCS 112. This provides a very stable clock reference for all of the base stations 100 and the PLURs 96. Therefore, in the application whereby the PLUR time stamps a received signal, the time base for all of the PLURS is very stable and is referenced to a common clock in the MCS 112. Without this, some other type of stable clock system would be required. This will be described in more detail hereinbelow.

The PDN is interfaced with a number of hubs 118 at different locations. Each of the hubs 118 is locked up to the MCS 112 through an SCS 120. They are also interconnected to each other through the PDN 106 and also to the uplink 30 through the PDN 106. In addition, a remote trunk concentrator (RTC) 122 is provided that interfaces with the PDN 106 through a modem 124, this being a conventional part of a paging system. All of the hubs 118–120 and the RTC 122 interface with the analog portion of the telephone network, the public switch network (PSN) 126, which PSN 126 and PDN 106 are interconnected, as indicated by a dashed line 128.

Figure 5:
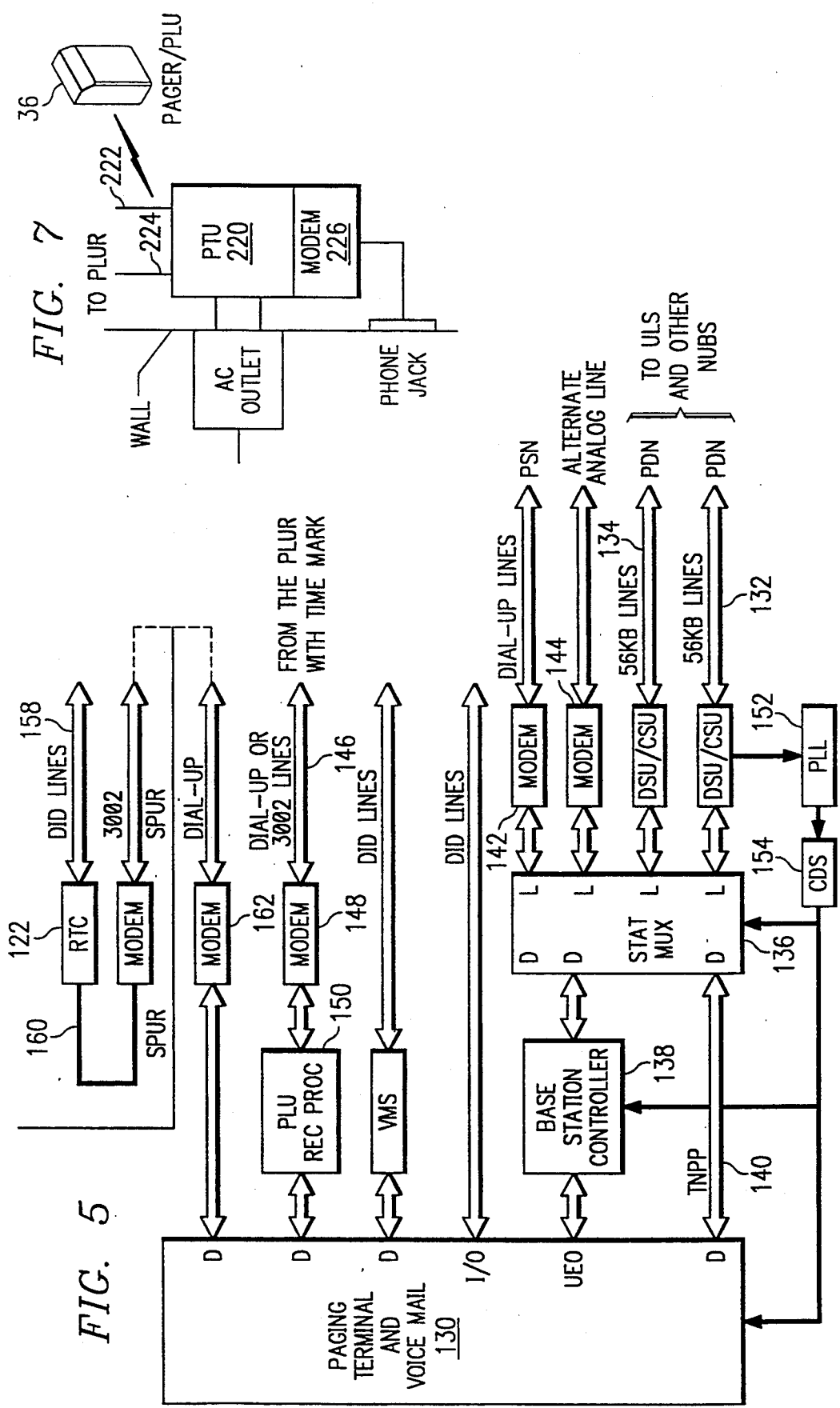
FIG. 5 illustrates a detailed block diagram of the HUB.

Referring now to FIG. 5, there is illustrated a block diagram of a conventional hub and illustrating a spur. The hub in general is comprised of a paging terminal 130 which, in the preferred embodiment, is a Glenayre 3000 XL, manufactured by Glenayre Corporation. This is a fairly conventional paging terminal and is utilized by paging systems. The hub is interconnected with the uplink systems through the PDN 106 via a primary 56-kilobit telephone line 132 and a secondary 56-kilobit telephone line 134. These lines are operable to connect to a multiplexer 136, which is input to both the paging terminal 130 through a base station controller 138 or directly through a TNPP line 140, which TNPP line provides for paging terminals to communicate with each other. The base station controller 138 is operable to assemble the data and implement the command and control functions for transmission out to the uplink system 114 and subsequently to the base station 100 through the satellite 28. The base station controller is an N1450, manufactured by Motorola. In addition, there are a number of dial-up lines which are received from the PSN through a modem 142 with alternate lines provided connected through a modem 144.

The lines from the PLUR 96 are received on telephone lines 146 through a modem 148 to a PLU receive processor 150, which is similar to the PLUR processor 98 of FIG. 3. The PLUR processor 150 basically processes the signals received from the PLURs 96 and then outputs location information to the paging terminal 132, and updates it internal database. As described above, each paging terminal generates data associated with its database and associated PLUs 36. If a new PLU 36 has come on line, the database can be updated, or if a mode is entered wherein specific sticks are to be transmitted with certain information, this information can be stored in the paging terminal 130.

A phase lock loop (PLL) 152 is provided for linking to the master clock signal which is on the 56-kilobit lines 132 and 134. This comprises the SCS 120. The PLL has a clock that is output to a clock distribution system (CDS) 154, which is utilized by the base station controller 138 and also by the paging terminal 130. The clock distribution is well-known, and is described, generally, in Masami Kihara, "Performance Aspects of Reference Clock Distribution for Evolving Digital Networks", IEEE Communications Magazine, April 1989, pp. 24-34. In addition, the RTC 122 provides the interface with the spur hubs through the telephone lines 158 and a modem 160. The spur interfaces with another modem 162 at the location of the hub for interface with the paging terminal 130.

Figure 6:
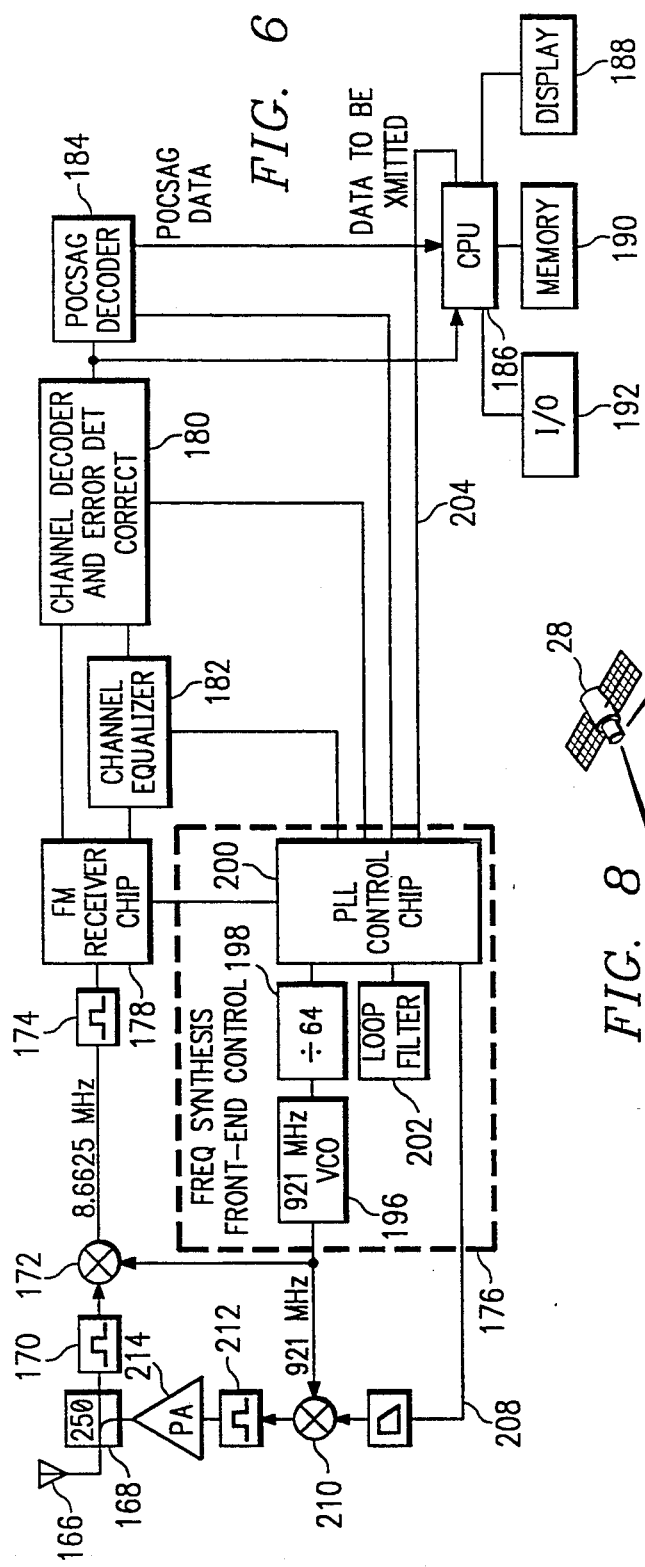
FIG. 6 illustrates a detailed block diagram of the personal location unit.

Referring now to FIG. 6, there is illustrated a block diagram of the PLU 36. An internal antenna 166 provides for both reception and transmission at a frequency in the UHF range. The receive frequency is 929.6625 MHz and the transmit frequency is 921.0 Mhz. An isolator 168 is provided which has three ports. One port is connected to the antenna 166, one input connected to the transmit side of the PLU and one port connected to the receive side. The receive side of the isolator 168 is input to a bandpass filter 170, the output thereof input to a mixer 172. The mixer receives a 921 MHz clock signal from a frequency clock synthesizer 176, such that the output is down converted to a frequency of 8.6625 MHz. The output of mixer 172 is input to a band pass filter 174, which preconditions the filter for input to a conventional FM receiver chip 178, which basically demodulates and hard limits the signal. The output of the FM receiver chip 178 is input to a channel decoder and error detection and correction circuit 180 and also to a channel equalizer 182. The operation of the channel equalizer 182 is described in G. E. Prescott, et al, "Adaptive Estimation of Transmission Distortion in a Digital Communication Channel", Correspondence IEEE Transactional Communications, Vol. 36, No. 4, Sep. 1988, pp. 1070–1073, and the FM receiver chip 178 is described in the Motorola Linear/Interface Integrated Circuits Data Book, DL12AREV2, p. 8–2. These are conventional chips.

The output of the channel decoder 180 is input to a POCSAG decoder 184. The POCSAG decoder is an OMIO33, POCSAG paging decoder device which is manufactured by Signetics, Part No. PCA 5000T. The output of the POCSAG decoder 184 is input to a CPU 186, which CPU also receives as an input the output of the channel decoder 180. The POCSAG data from the output of 184 comprises the message data received during conventional operation of the system. The output of the channel decoder 180 is all the information that is necessary for the CPU 186 to determine the location ID of the stick having the strongest signal during transmission of location IDs. The CPU 186 has associated therewith a display 188, a memory 190 and an input/output 192. The input/output 192 is in the form of a keyboard or input buttons.

The frequency synthesizer chip 176 is a conventional phase lock loop. It is comprised of a voltage controlled oscillator 196 that operates at 921 MHz. The output of the VCO 196 is divided down by a factor of sixty-four by a divide circuit 198 and input to a PLL control chip 200. A loop filter 202 is also provided, the loop filter interfacing with the PLL control chip 200. The PLL control chip 200 is a conventional control chip that has disposed thereon a phase detector and the various circuitry for interfacing and forming the loop filter 202.

The CPU 186 is operable to generate message data for transmission out through the antenna 166, the data being output on a line 204. The data on line 204 is input to the PLL control chip 200 to modulate data and output it on a line 208 for input to a mixer 210. The Local Oscillator input of the mixer 210 is connected to the output of the VCO 196. The output of the mixer 210 is filtered with a filter 212 and then input to a power amplifier 214 for input to the transmit side of the isolator 168.

Referring now to FIG. 7, there is illustrated a block diagram of a system for increasing the power level transmitted by the PLU 36. Since the PLU 36 is operated on a battery, it is necessary to minimize the amount of power transmitted thereby. Therefore, the power level is relatively low. When the PLU 36 is disposed on a person or a moving object that is within the confines of a building, the power level from the PLU 36 may be too low to reach the PLUR 96 and its associated antenna 94, disposed on one of the proximate sticks. Therefore, a building could be equipped with power transmitting units (PTU) 220, which has a receiving antenna 222 and a transmitting antenna 224. The information transmitted by the PLU 36 is received by the PTU 220 on its receiving antenna 222, buffered, and then transmitted out at a later time (preferably one frame) through the transmitting antenna 224 to the PLUR 96 at a higher power level and at the same frequency. This higher power level is sufficient to penetrate the walls of the building. The PTU 220 is powered from an AC outlet and, alternately, the PTU 220 can operate as a PLUR and interface with the PDN through a modem 226.

Figure 8:
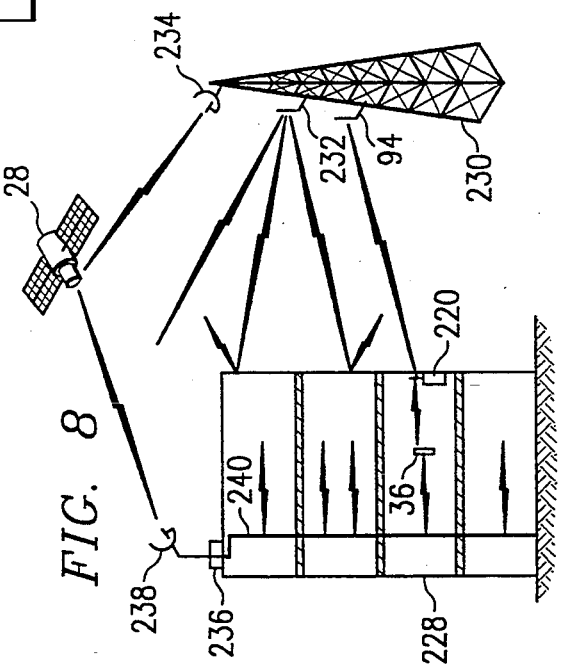
FIG. 8 illustrates a cross-sectional view of a building, illustrating a PTU and a PLU.

Referring now to FIG. 8, there is illustrated a cross-sectional view of building 228, illustrating a PTU 220 and a PLU 36. The PLU 36 is disposed within the building 228 and is operable to transmit information to the PTU 220. A stick 230 is disposed proximate to the building 228, having a PLUR antenna 94 associated therewith and a paging antenna 232 associated therewith. In addition, a satellite receiver antenna 234 is associated with the stick 230. Due to the attenuation provided by the walls of the building 228, the PLU 36 cannot transmit from within the building to the PLUR antenna 94. Additionally, the signal strength from the paging antenna 232 is insufficient to reliably penetrate the walls of the building. The PLU 36 can neither transmit information out nor receive information within the building. Therefore, the building itself is made into a cell or a separate "stick" by disposing a base station 236 and associated satellite receiver antenna 238 on the roof thereof to communicate with the satellite 28. The paging antenna is formed by a leaky coax 240 in the building. The leaky coax is operable to emit radiation at relatively low power, but sufficient to encompass all areas within the walls of the building 228. Therefore, the entire building would be considered a stick in and of itself and would have its own location ID. Therefore, if the paging terminal 36 were transmitting location ID information, it would indicate that it was in a particular building, as this would be the strongest signal received by the PLU 36.

Referring now to FIG. 9, there is illustrated a flowchart for the operation of the PLU 36. The flowchart is initiated at a start block 244 and the system goes to a decision block 246 to determine if the preamble has been received. If not, the program flows back around the "N" path to the input until the preamble is received. When the preamble is received, the program flows along a "y" path to a decision block 250 to achieve POCSAG sync. The program flows along an "N" path back to the input thereof until sync is achieved, at which time it flows along a "Y" path to the input of a decision block 252 to determine if the address has been received. The program flows along the "N" path to the input of the idle address decision block 248 until the address has been received, at which time it flows along a "Y" path from decision block 252 to a decode data block 256 to decode the data. The decision blocks 250, 248 and 252 and block 256 represent the POCSAG decoder chip.

If the idle address has not been received, the program flows along an "N" path back to the input of decision block 250. When the idle address has been received, the program flows along a "y" path from decision block 290 to a decision block 291 to determine if the call sign codeword data command (stating that the call sign will follow) has been received. If not, the program returns to input of decision block 250 and, if so, the program flows to decision block 293 to determine the ID sequence. The program then flows to program "A".

After the data has been decoded, the program flows to a decision block 258 to determine if the data is a request. If it is a request, the program flows along a "Y" path to a function block 260 to transmit the stored stick ID to the PLUR 96 in association with the ID of the PLU 36. This is coded and transmitted out through the transmitter. The program then flows to an End block 262. If a request was not received, this indicates a standard message and the program would flow from the decision block 258 along a "N" path to a function block 264 to process the message and then to the End block 262.

When the stick ID is received at decision block 293, the program would flow along a "Y" path therefrom to program "A", which is initiated at a function block 266 to decode the stick ID. The stick ID is then stored, as represented by a function block 268, and then compared with the authorized stick ID stored in the database of the PLU 36. This is indicated by a function block 270. The program flows to a decision block 272 to determine if the comparison was true. If so, this indicates that the pre-authorized stick ID codes compare with the received stick ID codes or the pre-stored stick ID code compares with the received stick ID code. If so, the program flows along a "Y" path from the decision block 272 down to a return block 274. If the comparison is not true, the program flows along an "N" path indicating a new ID.

When a new ID is received, the program flows to a function block 276 to transmit the stick ID to the PLUR in association with the PLU ID. The program then flows to a decision block 278 to wait for an acknowledgement message, which would be received at the output of the decode data function block 256. If the acknowledgement message has been received, the program would flow along the "Y" path from decision block 278 to the return block 274. However, if the acknowledgement message has not been received, the program flows along the "N" path to a function block 280 to retransmit the PLU ID and stick ID. The program would flow to a function block 282 to increment a value "N" by one and then to a decision block 284 to determine if the value is equal to a maximum value. If not, the program would flow from decision block 284 along an "N" path back to the input of block 278 to again determine if the acknowledge message has been received. This will be continued until "N" reaches a maximum value, at which time the program flows along a "Y" path from decision block 284 to a function block 286 to output a tone to the user indicating that the PLU 36 has not been able to establish its new location with the local hub. The program would then flow from function block 286 to a return block 274.

Referring now to FIG. 10, there is illustrated a flowchart for calculating the Time-Difference-of-Arrival (TDA). The program is initiated at a start block 290 and then flows to a function block 292 to request transmission of the PLU ID from a PLU 36. The program then flows to a function block 294 to receive a request message, indicating the step whereby the PLU 36 has received the request to transmit its unique PLU ID. The program then flows to a function block 296 indicating the step whereby the PLU 36 transmits the location data consisting of the most recently received stick ID and the PLU ID. In addition, the PLU 36 could also transmit a range code which provides the ability to optimally cross-correlate the received data for time-of-arrival values. This is a conventional technique which is disclosed in R. Dixon, "Spread Spectrum Communications", Wiley The program then flows to a function block 298, indicating the step whereby the PLU transmission has been received at the PLUR. The PLUR then time tags the signal, as indicated by a function block 300. The program then flows to a function block 302, indicating the step whereby the ID of the PLU and the time tag information, in addition to the stick location information, is sent back to the central processing unit. The PLUR processor then computes the location of the PLU 36 as indicated by a function block 304 by one of the various techniques described above. The program then flows to a function block 306 to store the location as updated data in the database. The program then flows to an End block 308.

Figure 11:
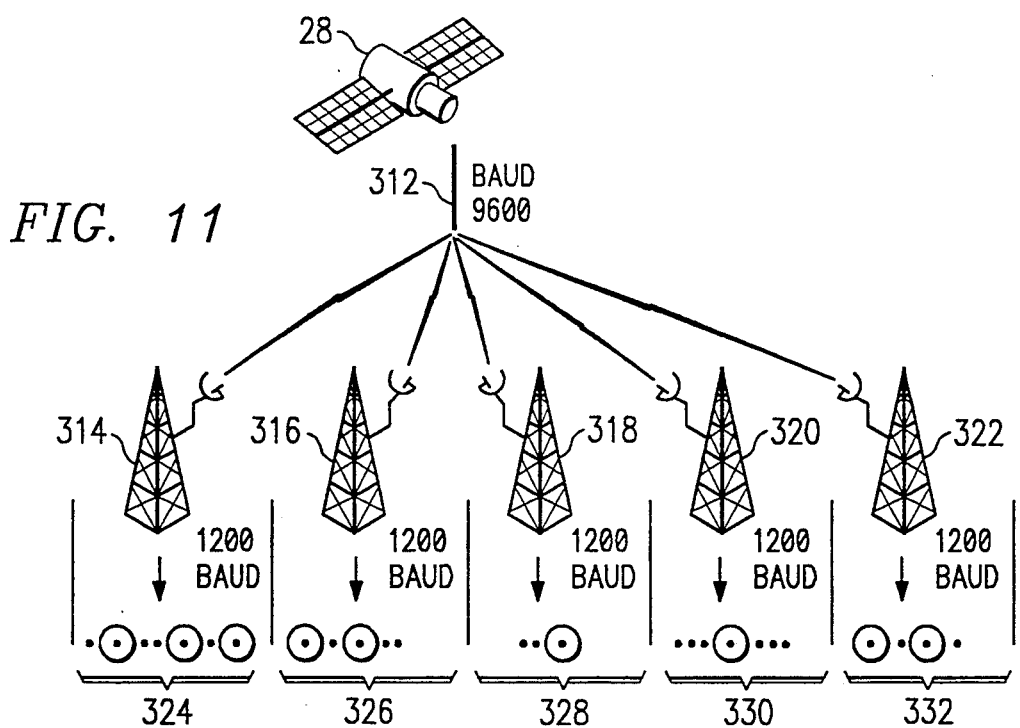
FIG. 11 illustrates a diagrammatic view of the cellular system for transmitting data to selective locations or cells.

Referring now to FIG. 11, there is illustrated a diagrammatic view of the cellular system of the present invention. The satellite 28 is operable to transmit a signal on a downlink 312 to the PLUs 36 that operates a relatively high data rate, 9600 baud, relative to the 1200 baud receiver data rate of the PLUs 36. Of course, the downlink 312 can operate at 56K baud. In general, on a given channel, the satellite 28 can transmit more data than can be transmitted out from the paging transmitters associated with the system. This allows the satellite 28 to transmit to multiple hubs. However, as will be described hereinbelow, the system of the present invention utilizes this feature to transmit multiple messages at the same time to "cells" within a system.

Whenever the system initiates a transmission string to any of the hubs, a key-up sequence is entered wherein the satellite addresses specific satellite receivers on specific sticks within the system. Of course, in simulcast systems each hub has overlapping RF fields for the individual sticks in the system. It is therefore necessary that all of the sticks be keyed-up at the same time. The key-up sequence is basically initiated by sending a key-up field wherein the ID of each of the sticks is transmitted to all of the sticks in the system. Of course, the sticks in a common hub would have a portion of the ID that would be designated as a group ID such that only one ID would be transmitted to key-up all of the sticks in that group. However, individual sticks can be keyed-up in response to a specific ID contained in the key-up field. After the key-up field is transmitted, a 576 bit preamble is then sent which comprises a synchronization field for the overall system. Thereafter, the messages are sent to the satellite receivers on each of the sticks in batches. Each batch is comprised of a synch word followed by up to eight 20-bit messages. Each message is comprised of an address followed by data. At the end of each batch, another synch word is sent followed by additional messages. After all of the information has been transmitted, a Wait field is interposed between the messages and a key-down field, wherein a key-down sequence is entered to key-down all of the transmitters such that they do not operate when there are no messages to be transmitted.

As illustrated in FIG. 11, there are five sticks, 314, 316, 318, 320 and 322, associated with the system that define a given hub during normal operation, i.e., a simulcast operation. Each of the sticks 314–322 is operable in the simulcast mode to receive simulcast data and transmit this data out into the associated locales for each stick 314–322, wherein it is assumed that all pagers within the hub can be in any locale associated with any of the sticks 314–322. Each of the locales for the sticks 314–322 is represented by brackets 324, 326, 328, 330 and 332, respectively. In each locale, there are associated a plurality of PLUs 36, represented by dots. However, there are a number of PLUs 36 within the locales 324–332 having a known location. These are represented by circles around the dots. For example, in locale 324, there are three PLUs 36 having the known location. In locale 326, there are two PLUs 36 having a known location. In locale 328, there is one PLU 36 having a known location. In locale 330, there is one PLU 36 having a known location. In locale 332, there are two PLUs 36 having a known location. Once the location is known, it is only necessary to transmit data to the stick associated with the paging receiver having the known location. In accordance with the present invention, once the location is known, the satellite 28 is then operable to transmit the information to the sticks 314–322 by selecting which of the sticks 314–322 is to receive the paging information at any given time slot. This is done through the unique ID that each of the sticks 314–322 possesses. Therefore, the satellite 328 can selectively transmit information to any of the sticks 314-322 for transmission only in its associated locale.

Whenever two adjacent sticks are present in a system with overlapping RF fields, which is always the case with respect to paging systems, there is a possibility that an ambiguity might exist as to the actual location of the PLU 36 from an RF field strength standpoint. For example, during the location-determining step the PLU 36 may be receiving from one stick and in the next instance the message may be received from the other stick that is in the adjacent pattern. This may be due to the fact that the PLU 36 is disposed equidistant between the two adjacent sticks. Since the PLU 36 captures the strongest signal, this may vary as a function of time, even though spatial location does not vary, due to fluctuations in atmospheric conditions, slight reorientation of the PLU 36 or even slight variations in the power transmitted from each of the sticks. Therefore, whenever overlapping RF fields are present, it may be desirable to turn on only the paging transmitter having previously been determined to have the PLU 36 located in its pattern and turning the adjacent paging transmitters off, thus making each stick and individual cell. Of course, this can present some problems in that paging transmitters within an area must be turned on and off in a non-overlapping manner, thus requiring the turn-on procedures for each transmitter to be sequenced for each message transmitted to a given cell. Thereafter, this cell is turned off and the adjacent cell is then turned on.

Figure 12:
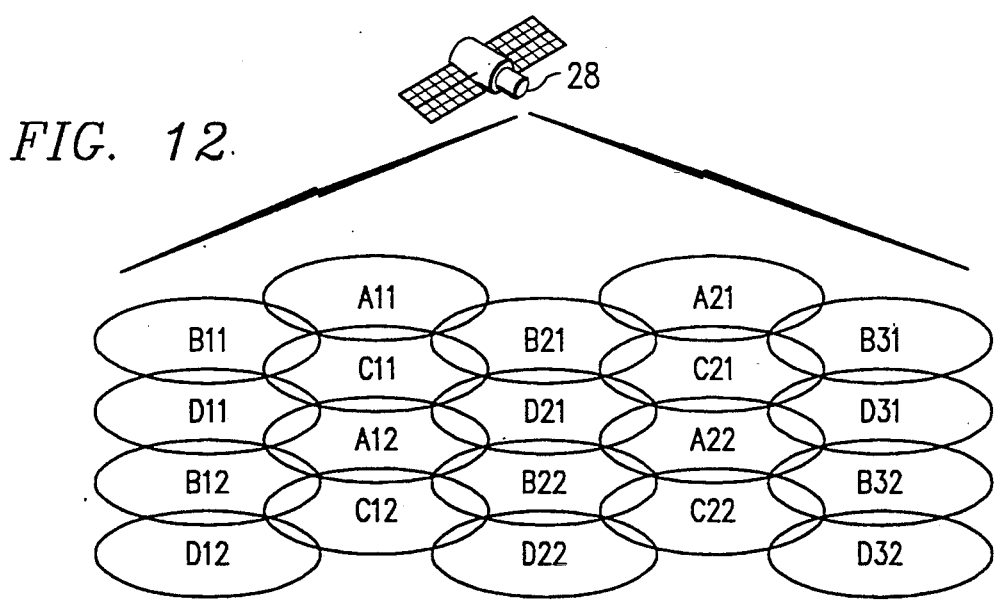
FIG. 12 illustrates a diagrammatic view of the various overlapping receive patterns.

Referring now to FIG. 12, there is illustrated a grid arrangement for determining which of overlapping ones of the cells are to be turned on and turned off. The cells are arranged in a matrix of A-cells, B-cells, C-cells and D-cells. All of these cells overlap. Therefore, it would be necessary to first turn on the A-cells, followed by the B-cells, followed by the C-cells and then by the D-cells. In an alternate embodiment of the present invention, the system can be controlled such that each of the PLUs 36 can receive messages from two paging transmitters through orthogonal coding. In this manner, two overlapping sites could be turned on and a paging receiver receiving from either one of the sites would receive the message since the messages are transmitted out of both adjacent cell sites. This would necessitate transmission of both messages out of one adjacent site and transmission of both messages out of the next adjacent sites with the PLU 36 being able to discriminate two messages. This will be described in more detail hereinbelow. However, in the preferred embodiment, the A- and B-cells would comprise one set of orthogonally overlapping cells and the C- and D-cells would comprise a second set of overlapping cells. Therefore, it would only be necessary to turn on all of the A- and B-cells, followed by turning on of all the C- and D-cells, thus increasing the throughput by a factor of a minimum of two.

Figure 13:
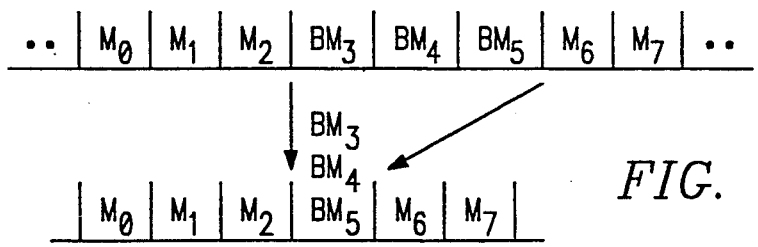
FIG. 13 illustrates diagrammatic view of the message string transmission.

Referring now to FIG. 13, there is illustrated a diagrammatic view of how the throughput can be increased by going to a cellular mode. In the top line, a message string is illustrated as being comprised of two types of messages, batch messages that are transmitted in the cellular mode, and normal messages that are transmitted during simulcast mode. Normal messages are designated as $M_x$, where x varies from 0 to n and the batch messages are designated as $BM_y$, where y ranges from 0 to m. The message string received by the paging terminal is illustrated as being comprised of three simulcast messages $M_0$, $M_1$ and $M_2$, three messages $BM_3$, $BM_4$ and $BM_5$, which are cellular messages, and two additional simulcast messages $M_6$ and $M_7$. The message string is transmitted out through the satellite 28 in two modes, a simulcast mode and a cellular mode. The simulcast mode is first entered and the messages $M_0$, $M_1$ and $M_2$ broadcast out to all sticks in the particular hub. Thereafter, the batch messages $BM_3$, $BM_4$ and $BM_5$ are all transmitted out in a single frame simultaneously in the cellular mode. In the cellular mode, the length of the frame is defined by the longest message that is to be transmitted. After the longest message has been transmitted, the system then goes back to the simulcast mode and messages $M_6$ and $M_7$ are transmitted. This illustrates the adaptive nature of the cellular system, i.e., it can recognize that messages are to be routed to specific locations, due to knowledge as to the location of the PLUs 36, and then group these messages for transmission in a cellular mode. Of course, the system can use the simulcast mode to determine location if necessary.

Referring now to FIGS. 14a and 14b, there is illustrated another example of transmission in the cellular mode. There are eight batch messages which are designated for being transmitted to PLUs 36 in the system having known locations. As described above, the location of the PLUs 36 associated with these batch messages is predetermined. As seen in FIG. 14a, the PLUs 36 are defined as being in three non-overlapping areas. The first isolated and non-overlapping area contains PLUs having the designated messages $BM_1$, $BM_2$, $BM_4$ and $BM_6$ associated therewith. The messages $BM_3$ and $BM_5$ are designated for a second isolated area and the batch messages $BM_8$ and $BM_7$ are designated to PLUs 36 in a third isolated area. Since there are three isolated areas to which messages are to be sent, this means that the three sticks associated with the three areas can be turned on at a given time. Therefore, the batch messages are arranged such that $BM_1$, $BM_3$ and $BM_8$ are transmitted at a common time. Thereafter, the batch messages $BM_2$, $BM_5$ and $BM_7$. $BM_4$ are then be transmitted in a single time slot message and $BM_6$ is then be transmitted in a single time slot.

Referring now to FIG. 15, there is illustrated a diagrammatic view of the cells of FIG. 12, illustrating additional building site cells ($BC_N$), wherein building sites are located within each of the various overlapping cell sites. These are similar to the ones described hereinabove with reference to FIG. 8. As described above, each of the building cell sites is effectively another cell site that essentially overlaps with the present cell sites described in FIG. 12. The building cell sites define another type of cell. However, the interference problem still requires that the cell site in which the building resides be isolated from the building cell site during transmission. Therefore, when building cell sites are transmitting, the cell in which they reside is not transmitting. Of course, building sites will not overlap with each other and there will be little interference due to the their being adjacent.

The message string is illustrated as being comprised of simulcast transmission to all cell sites, cellular transmission to the buildings and cellular transmission to the cell sites. Initially, the system is in a simulcast mode to broadcast the message $S_N$. The system then goes into a cellular mode broadcasting to the buildings. The first cellular message is $BC_N$, and the second cellular message is $BC_{N+1}$. Of course, during $BC_N$, multiple messages can be transmitted to the different building cell sites. After the message $BC_{N+1}$ is transmitted, the system goes back to the simulcast mode and broadcasts the message $S_{N+1}$. The system then goes into the cellular mode and transmits messages in a batch mode to all of the A- and B-cells in the orthogonal mode and then switches to transmit messages to the C- and D-cells in the orthogonal mode. The system then switches to transmit two sequential messages to the building sites as cellular messages $BC_{N+2}$ and $BC_{N+3}$. Thereafter, the next simulcast message $S_{+2}$ is then transmitted in the simulcast mode and then the system transfers back to the cellular mode. In the cellular mode, the next cellular message is transmitted to the A- and C-cells at the same time by orthogonal coding and then the message is transmitted to the C- and D-cells. The system then converts back to the simulcast mode and transmits message $S_{N+3}$. As can be seen from the system of FIG. 15, the system can adaptively convert between simulcast and cellular mode and arrange the data in any manner during cellular mode to optimize efficiency of transmission thereof.

Referring now to FIG. 16, there is illustrated an alternate method whereby data is transmitted to the paging system at the stick site through either the phone line or through a CATV system. The paging terminal 44 is operable to interface with the PSN 34 to transmit data thereto. This data is time-tagged or file-tagged prior to transmission to the PSN 34 through a time-sequence controller 337. The paging terminal 44 operates in conjunction with a stick controller 339 and the time-sequence controller 337 to first determine which messages should be transmitted as data through the phone line and then assemble these messages for transmission thereto. As will be described hereinbelow, these messages typically are those that exceed a certain length that would make it impractical for them to be transmitted through the satellite 28. The overall clock system is synchronized through the Master Clock System (MCS) 112 in the PSN 34 with the Slave Clock System (SCS) 120 synchronizing up to the MCS 112 and providing a stable clock for the operation of the paging terminal 44 and the time-sequence controller 337.

The data or message information is transmitted from the paging terminal 44 through the PSN 34 via a modem 338 to a processor 336 associated with the paging system 334. A memory 340 is provided for storing files and data that are to later be transmitted to the PLU 36 through the leaky coax 240 (by way of example). The leaky coax 240 can be any of the paging antennas that are associated with the various paging systems, as illustrated by paging system 334. An alternate route to the PSN 34 is to send the data via a T2 line through a CATV system 341.

In operation, the paging terminal 44 through the time-sequence controller 337 will determine whether the data is to be transmitted as messages, i.e., a short message, or it is to be transmitted through the alternate "hardwired" connection or path to the paging system 334. If, for example, the message is greater than a predetermined length, it will be transmitted as a file via the alternate routing path.

In general, the purpose for transmitting the data over a phone line is that the control link in a paging system is one of the least reliable subsystem entities. This is primarily due to multiple objectives requiring trade-offs with lack of reasonable margins without excessive cost. Also, with a desire to increase the paging rate, the link band width and timing accuracy must increase. This multiple improvement can be achieved in a more reliable and cost-effective manner by isolating the operation wherein the data can be transmitted separately from the control and clock information via an alternate path. Therefore, multiple control links are provided with the satellite 28 primarily providing the clock and control portion thereof.

In conventional systems, the page requests from the phone line input are first formatted by the paging terminal 44. Next, the paging transmitter control signals are then appended by the controller 339 to form a composite control link signal. The control link signal is then transported to the appropriate paging transmitters and paging systems 334. The paging transmitters at the paging system 334 receive this control link signal and execute it on a real-time basis. All time related adjustments, therefore, must be made during non-paging activities and considered an alignment function with respect to the overall system. In simulcast paging systems, as described in the present invention, the phasing or time relationship between adjacent RF field transmitter outputs is bounded, and is set to within a fractional bit time. Therefore, the control link through the satellite 28 must deliver its signal to the paging transmitter with a minimum differential error between the various adjacent RF fields. Therefore, in conventional paging systems, three primary elements exist with respect to controlling signalling, the command and control signals associated with the paging transmitter, the paging signal to be transmitted, and the timing or phasing of the paging transmitter paging signals transmitted therefrom relative to the adjacent RF field paging transmitter transmit paging signals.

The third element, the timing or phasing, has been the major problem for paging systems. The present system provides this timing through use of the MCS 112 and SCS 120 that utilize the time base of the PSN 34. In addition to all of this, providing data at the destination at or prior to the transmission time allows data to be sent via alternate paths to the required destinations. However, for this system to operate, the paging transmitter must have the ability to hold the data until requested by the transmission sequence. Due to the serial sequential nature of this, the memory 340 acts as an elastic serial memory but standard Random Access Memory also will work.

There are three modes of operation for the system of FIG. 16. The first mode is the normal standard mode using a standard time difference accurate control angle link. This is typically a terrestrial Radio Control Link (RCL), but Direct Satellite Control Link (DSCL) is the preferred embodiment for this time differential accurate control link. In the second mode, the data in each page is evaluated, and if greater than a 20-bit word is present, it is replaced with a 20-bit file name and sent out to the satellite control link as a file name. Also, the named data is tagged with that name and sent by an alternate path to the required sticks at the various paging systems for storage in the associated memory 340. This is the preferred embodiment including the POCSAG format, and a like process would be implemented for other control link formats and options. In the third mode, the command and control signals plus data is sent by the alternate path. Only timing is supported by the satellite link. If the third mode is the only mode of operation, then timing could be acquired from satellite or terrestrial sources such as the GPS, TDRS, LORAN-C, OMEGA, DECCA and related Navaids.

The second and third modes of operation provide additional benefits. One of the major disadvantages of classical paging systems is that the transmission system is configured such that a request can only be inserted at the originating point of the control link. Two examples are inserting a call sign or secondary pages. If the call sign resides in the paging transmitter, it could be executed more efficiently in an automatic manner, or by remote command if the second or third mode features are present in that set of paging transmitter units. One implementation of the second and third modes can account for interference between two or more paging terminals having continuous RF fields. Since the data arrives at the paging transmitters prior to transmission by a defined time value, the time slot during arrival can then be evaluated for insertion of secondary inputs such as a call sign or paging signals from a second paging terminal. Therefore, any missing data from time zero to that defined time is a non-transmission time from that source. Therefore, a transmission could be inserted during that non-transmission time. In the case of a POCSAG format, if the defined time is an integral of 454 MS, then integer 1200 BPS batches could be synchronously inserted from the secondary source.

With further reference to the second mode of operation, each paging sequence requires the data for a specific pager address to be replaced with a file name. This new sequence is linked to the paging transmitter via the satellite link through satellite 28. The file name is also assigned to the data that it replaced. This data file is then sent to the destination sticks via the phone line or through the CATV system 341 and held until requested via the satellite link. Therefore, a page transmitted with the second mode of operation contains the pager address and the file name of the data to be transmitted, not the actual data. The data is therefore transmitted over the alternative link with the command and control information sent over the satellite link. The functions that go over the satellite link are basically the paging signal to the uplink, the message content, POCSAG, which contains the carrier turn-on, the Time of Day (TOD) (optional), the key-up sequence, the preamble, the batches, the frame, the address, the data file name, the hold time and the key-down sequence. The paging system 334 is operable to recognize the data as being a file name and automatically inserts the file having that file in place of the data. Essentially, the satellite transmit sequence is the same as a normal paging sequence, except the data is not actually transmitted over the satellite link, only the file name is sent.

In the third mode of operation, the total paging signal is time/sequence tagged and sent to the paging system 334 via the alternative route where it is stored. When it is time to transmit this signal, it is then transmitted, requiring only some timing information from the satellite 28 through the downlink. The clock and Time of Day (TOD) or sequence signal is derived from the satellite signal. The satellite signal consists of at least the clock and the TOD or sequence signals. All paging signals operating in the third mode of operation are time/sequence tagged and transferred to the sticks via the alternative links with the time and order of transmission controlled by the satellite downlink.

Referring now to FIGS. 17a and 17b, there are illustrated flow charts for the operation of the system of FIG. 16. The program is initiated at a start block 342 and then proceeds to a function block 344 to mark the data. At this function block, it is determined whether the data is to be time-marked or to be marked with a file name. This marked data is then transmitted to the paging system, as indicated by a function block 346. The control and clock signal is then sent to the satellite for transmission to the appropriate one of the paging systems 334. The program then flows to return block 350.

In FIG. 17b, the flowchart for the paging system 334 is illustrated. The program is initiated at a start block 352 and then proceeds to a function block 354 to determine whether the system is operating in the mode wherein data is time-marked. If not, the program flows along the "N" path to a function block 356 wherein a message is received. When the message is received, the data portion thereof is examined to determine if this data is a file name and compares with an already stored file. If so, the program flows along a "Y" path to fetch the file and transmit it, as indicated by a function block 366. The program then would flow back to the input of the decision block 354. However, if it were determined that this were a standard paging message broadcast through a simulcast mode, the program would flow along the "N" path and transmit the message in a normal fashion, as indicated by a function block 360. The program would then flow back to the input of the time decision block 354.

If the system were working in the time-tagged mode of operation, i.e., the third mode of operation, the system would flow from the decision block 354 along the "Y" path to a function block 362 to compare the files that were stored to the time base. The program would then flow to a function block 364 to determine if it were time to transmit. If not, the program would flow along the "N" path back to the input of the function block 362 and, when the time for transmission occurred, the program would flow along a "Y" path to function block 366 to transmit the file.

Referring now to FIG. 18, there is illustrated a more detailed diagram of the system of FIG. 16. The controller 337 is illustrated as an interface controller and time/sequence tagging system. This essentially is a personal computer that, as described above, examines the data to determine if it exceeds a 20-bit word. If so, then it either gives it a file name or time-tags it and routes it to the paging system through an alternate link. The paging terminal 44 is manufactured by Glenayre Corporation, Part No. 3000XL. The paging transmitter controller is manufactured by Motorola, Part No. DDC1450. These are conventional components of a paging system. The Direct-Inward-Dial (DID) lines enter the paging terminal and then the paging terminal verifies, formats and sends a transmission sequence to the interface controller 337 and then to the paging transmitter controller 339. The controller 339 then sends out the transmitter control sequence to the interface controller 337. The interface controller 337 then sends the clock and the TOD or sequence through a clock and time/sequence distribution system 366, which essentially comprises the satellite 28. The interface controller 337 also sends the command and control functions (the stick and paging) to the command and the control distribution media, represented by a block 368. The data is sent through a data distribution medium 370. Both the blocks 366 and 368 can be represented by the satellite link in the second mode of operation, whereas the data distribution system 370 is represented by the phone link. The paging system 334 is represented by a dotted line which includes the memory 340 and the processor 336, which is referred to as a sequence controller.

The clock and time/sequence distribution system 366 sends the various clock and timing/sequence signals to all paging systems 334 for receipt by the time and event generator, as represented by block a 372. The command and control distribution block 368 distributes the command and control signals to at least the required ones of the paging systems 334. The data distribution system 370 distributes the data to destination ones of the paging systems 334. The time and event generator 372 extracts the clock, TOD and sequence signals from the clock and time distribution medium 366 and then sends the clock to a paging transmitter 374. A command and control receiver 376 is provided in the paging system for receiving the command and control signals from the block 368. A data receiver 380 is provided for receiving data from the data distribution system 370. The data receiver inputs the data into the memory 340, whereas the command and control receiver is interfaced with a sequence controller 336. The sequence controller 336 takes the command and control sequence from the receiver 376 and sequences out the paging signal to the paging transmitter 374 in conjunction with the data stored in memory 340 and the time and event signal from generator 372. The paging transmitter 374 can be a system manufactured by Motorola, Part No. PURC5000, which is operable to lock the transmitter clock therein to the receive clock and then transmit out RF transmission signals through the associated antenna 384.

Referring now to FIG. 19, there is illustrated a block diagram of the receiver in the PLU 36 for receiving upper and low sideband signals, to allow orthogonal coding. The PLU 36 has a conventional FM receiver 386 disposed therein which is operable to receive the upper and lower sideband coded signals on an antenna 388. These are then filtered by an upper band filter 390 and a lower band filter 392, such that two signals can be discriminated. These are input to a POCSAG decoder 394, which operates at a higher rate, i.e., 2400 baud, with both the upper band filter 390 and the lower band filter 392 operating at 1200 baud. The POCSAG decoder will be operable to decode either one of the signals and output them on an output 396. The coding for the upper and lower sidebands of the signal would require less than 3 kHz bandwidth and is a conventional technique.

Referring now to FIG. 20, there is illustrated a block diagram of an alternate embodiment for increasing the throughput. An initial signal is received at 4800 baud in the paging system at the stick site and is input to a precoder, which can be a modem 398. The modem then outputs a conventional phone line signal at a 1200 baud rate, which is input to the paging transmitter 400 and out through an antenna 402. The PLU 36 is then operable to receive this signal on the antenna 388 and down-convert it with the FM receiver 386. A second modem 404 is operated in the demodulation mode to demodulate the 1200 baud input signal to a 4800 baud signal, which is then input to a POCSAG decoder 406 that operates at 4800 baud rate. In this manner, the throughput has been increased by utilizing predecoding.

In summary, there has been provided an adaptive cellular paging system wherein paging can be effected on a simulcast basis or on a cellular basis. In the cellular basis, the location of certain pagers is determined such that the RF position is known within the system. Thereafter, multiple messages can be sent simultaneously to different paging transmitters within a system, such that the entire system does not have to receive the same message. This increases the throughput to the system.

Although the preferred embodiment has been described in detail, it should be understood that various changes, substitutions and alterations can be made therein without departing from the spirit and scope of the invention as defined by the appended claims.

What is claimed is:

1. An adaptive paging system for delivering predesignated messages to select ones of a plurality of paging receivers, comprising:

first and second paging systems for receiving the predesignated messages designated for the select ones of the paging receivers, each of said first and second paging systems having a paging transmitter for transmitting said received predesignated messages over an RF link to the ones of the paging receivers being within an associated predetermined transmission locale about said paging transmitter, which said transmission locale defines the area within which the paging receivers can receive messages;

a location system for determining in which of said first and second paging systems associated predetermined transmission locale that the select ones of the paging receivers can receive the predesignated messages for substantially all positions of said select ones of said paging receivers within the predetermined locale of the predetermined one of said first and second paging systems;

a transmission device for generating the predesignated messages for transmission to the select ones of the paging receivers;

a transmission link for connecting said transmission device to said first and second paging systems; and routing control circuitry for controlling said transmission device to transmit each of said generated predesignated messages only to the one of said first and second paging systems at which associated predetermined transmission local said location system has determined that the destination ones of the paging receivers can receive predesignated messages.

2. The adaptive paging system of claim 1 wherein said transmission device comprises;

a paging terminal for generating said predesignated messages as paging messages;

a satellite for receiving paging messages generated by said paging terminal and for transmitting said paging messages via said transmission link to said first and second paging systems; and a satellite uplink for transmitting said generated paging messages from said paging terminal to said satellite.

3. The adaptive paging system of claim 2 wherein said paging terminal is operable to generate nondesignated messages as paging messages for transmission to all of the paging receivers wherein said routing control circuitry is operable in first and second modes, said routing control circuitry in said first mode operating to control said transmission device to transmit each of said raging messages associated with said, generated predesignated messages only to the one of said first and second paging systems at which said location system has determined that the destination paging receivers can receive predesignated messages, and in second mode operating to transmit said paging messages associated with said generated nondesignated messages to both said first and second paging systems, and further comprising control circuitry for switching between said first mode and said second mode in accordance with predetermined criteria to change the system throughput.

4. The adaptive paging system of claim 1, wherein said location system comprises:
- a location transmitter co-located with each of the plurality of paging receivers;
- each of said paging transmitters operable to transmit a unique transmit ID for the associated one of said first and second paging systems and confined within said associated predetermined transmission locale, and transmitted on a periodic basis;
- each of the paging receivers having a unique receive ID associated therewith and operable to receive said unique transmit ID transmitted in the one of said predetermined transmission locales in which the paging receiver is operable to receive transmissions, each of the paging receivers operable to transmit the received transmit ID and the associated unique receive ID through said co-located location transmitter over a location RF link; and
- a location receiver disposed at a predetermined location for receiving from said RF link the transmitted transmit ID and associated receive ID from the select ones of the paging receivers, said receive IDs and associated transmit IDs forwarded to said routing control circuitry.

5. The adaptive paging system of claim 4, wherein said location receiver is comprised of first and second location receivers, each of said first and second location receivers co-located with respective ones of said paging transmitters for each of said first and second paging systems.

6. The adaptive paging system of claim 4, wherein:
- said transmission device is operable to generate a request-to-send message for each of the select ones of the paging receivers and said routing control circuitry is operable to control said transmission device to transmit said request-to-send messages to said first and second paging systems for receipt by all of the plurality of paging receivers within either of said predetermined transmission locales of either of said first and second paging systems; and
- the select ones of the paging receivers receiving the one of said request-to-send messages designated therefor operable to transmit the received transmit ID and associated receive ID with said co-located location transmitter over said location RF link.

7. The adaptive paging receiver of claim 1, wherein each of said predetermined transmit locales associated with said first and second paging systems have a portion thereof that overlap each other.

8. The adaptive paging system of claim 6, wherein said routing control circuitry is operable to inhibit transmission by said transmission device to more than one of said first and second paging systems.

9. A method for adaptively delivering predesignated messages to select ones of a plurality of paging receivers, comprising the steps of:
- disposing first and second paging systems within predetermined transmission locales associated therewith, each of the predetermined transmission locales defining the area within which the paging receivers can receive messages;
- receiving the predesignated messages that are designated for the select ones of the paging receivers at the first and second paging systems and retransmitting the received predesignated messages within the associated transmission locales;
- determining in which of the predetermined transmission locales associated with the first and second paging systems the select ones of the paging receivers can receive the predesignated paging messages for substantially all positions of the select ones of the paging receivers therein;
- generating the predesignated messages for transmission to the select ones of the paging receivers;
- providing a transmission link from a transmission device to the first and second paging systems; and
- controlling the transmission device to transmit each of the generated predesignated messages only to the one of the first and second paging systems at which associated predetermined transmission locale the step of determining has determined that the destination ones of the paging receivers can receive predesignated messages.

10. The method of claim 9, and further comprising, generating nondesignated messages as paging messages for transmission to all of the paging receivers, wherein:
- the step of controlling the transmission device operates in first and second modes, with the first mode operable to control the transmission device to transmit each of the paging messages associated with the generated predesignated messages only to the one of the first and second paging systems at which the step of determining has determined that the destination paging receivers can receive predesignated messages;
- the second mode operable to control the transmission device to transmit paging messages associated with the generated nondesignated messages to both first and second paging systems, and
- further comprising the step of switching between the first and second modes in accordance with predetermined criteria to change the system throughput.

11. The method of claim 9, wherein the step of determining comprises the steps of:
- co-locating a location transmitter with each of the plurality of paging receivers;
- transmitting a unique transmit ID from the paging transmitters at each of the first and second paging systems and confined within the associated predetermined transmission locale, and transmitted on a periodic basis;
- each of the paging receivers having a unique receive ID associated therewith and each of the paging receivers receiving the transmit ID transmitted in the one of the predetermined transmission locales in which the paging receiver is operable to receive transmissions;
- transmitting from the transmitter co-located with each of the paging receivers the received transmit ID and the associated unique receive ID over a location RF link; and
- disposing a location receiver at a predetermined location; and
- receiving at the location receiver from the RF link the transmit ID and associated receive ID from select ones of the paging receivers, the receive IDs, and associated transmit IDs utilized in the step of controlling the transmission device.

12. The method of claim 11, wherein the step of disposing the location receiver comprises disposing first and second location receivers at each of the first and second paging systems, respectively, such that they are co-located with the associated paging transmitters.

13. The method of claim 11, and further comprising the steps of:

generating a request-to-send message for each of the select ones of the paging receivers and the step of controlling the transmission device operable to control the transmission device to transmit the request-to-send messages to the first and second paging systems for receipt by all the plurality of paging receivers within either of the predetermined transmission locales of either of the first and second paging systems; and receiving at the select ones of the paging receivers the one of the request-to-send messages designated therefor; and transmitting the received transmit ID and associated receive ID with the co-located location transmitter over the location RF link.

* * * * *